(12) United States Patent
Horiguchi

(10) Patent No.: US 7,631,334 B2
(45) Date of Patent: Dec. 8, 2009

(54) INFORMATION PROCESSING DEVICE, INFORMATION PROCESSING METHOD AND MEDIUM

(75) Inventor: Mari Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1357 days.

(21) Appl. No.: 09/761,416

(22) Filed: Jan. 16, 2001

(65) Prior Publication Data

US 2001/0023431 A1    Sep. 20, 2001

(30) Foreign Application Priority Data

Jan. 18, 2000    (JP)    ............................. 2000-013957

(51) Int. Cl.
*H04N 5/445* (2006.01)
*H04N 5/91* (2006.01)

(52) U.S. Cl. .............................. 725/58; 386/83; 386/95

(58) Field of Classification Search ................... 386/83, 386/95; 725/58, 37, 78, 80, 82, 85, 141, 725/39, 40; 715/713
See application file for complete search history.

(56) References Cited

U.S. PATENT DOCUMENTS

| | | | | | |
|---|---|---|---|---|---|
| 5,307,173 | A | * | 4/1994 | Yuen et al. | 386/83 |
| 5,526,130 | A | * | 6/1996 | Kim | 386/83 |
| 5,608,730 | A | * | 3/1997 | Osakabe et al. | 725/153 |
| 6,002,394 | A | * | 12/1999 | Schein et al. | 725/39 |
| 6,173,112 | B1 | * | 1/2001 | Gruse et al. | 725/58 |
| 6,177,931 | B1 | * | 1/2001 | Alexander et al. | 725/52 |
| 6,182,094 | B1 | * | 1/2001 | Humpleman et al. | 715/513 |
| 6,725,281 | B1 | * | 4/2004 | Zintel et al. | 719/318 |

OTHER PUBLICATIONS

AV/C Digital Interface Command Set General Specification, Version 3.0, Apr. 15, 1998.
Enhancements to the AV/C General Specification 3.0. Version 1.0, Jan. 26, 1999.
AV/C Bulletin Board Subunit General Specification, Version 1.0, Aug. 14, 1999.

* cited by examiner

*Primary Examiner*—Vincent Boccio
(74) *Attorney, Agent, or Firm*—Finnegan, Henderson, Farabow, Garrett & Dunner, L.L.P.

(57) ABSTRACT

Any of the AV devices or the users of a network system to which the present invention is applied can input detailed information on a recording reservation and provide the remaining AV devices and the users with the detailed information on the recording reservations that the AV device or the user has and it is possible to realize a means to be used by any of the AV devices or the users to provide the remaining AV devices and the users with the detailed information on the recording reservations that the AV device or the user has. Such a system can effectively avoid occurrence of so-called double booking and is easy to use for the users. In a specific processing operation, raw_text_information_block containing a raw text showing details of a reservation and character_code_information_block and language_code_information_block showing the coding of the raw text are described in a Resource Schedule Entry of an RSB.

15 Claims, 25 Drawing Sheets

| Address_offset | Contents |
|---|---|
| $00_{16}$ | non_info_block_fields_length |
| $01_{16}$ | |
| $02_{16}$ | board_type |
| $03_{16}$ | object_list_maximum_size |
| $04_{16}$ | |
| $05_{16}$ | object_entries_maximum_number |
| $06_{16}$ | |
| $07_{16}$ | object_entry_maximum_size |
| $08_{16}$ | |
| $09_{16}$ | board_type_dependent_information_length |
| $0A_{16}$ | |
| $0B_{16}$ | board_type_dependent_information |
| $0C_{16}$ | |
| $0D_{16}$ | |
| : | |
| : | optional info blocks for future expansion |
| : | |

FIG.5

| Value | Board type |
|---|---|
| $00_{16}$ | Reserved |
| $01_{16}$ | Resource Schedule Board |
| $02_{16}$-$FF_{16}$ | Reserved for future specification |

Resource Schedule Entry high level view

| Address_offset | Contents |
|---|---|
| $00_{16}$ | year(msb) |
| $01_{16}$ | year(lsb) |
| $02_{16}$ | month |
| $03_{16}$ | day |
| $04_{16}$ | hour |
| $05_{16}$ | minute |
| $06_{16}$ | second |

FIG.9

| Address_offset | Contents | |
|---|---|---|
| $00_{16}$ | Reserved(4 bits) | hours(msb) |
| $01_{16}$ | hours(lsb) | |
| $02_{16}$ | minutes | |
| $03_{16}$ | seconds | |

FIG.10

| Values | definition |
|---|---|
| $00_{16}$ | Weekly schedule |
| $01_{16}$–$0F_{16}$ | reserved |
| $10_{16}$ | Interval schedule |
| $0F_{16}$–$FF_{16}$ | reserved |

FIG.11

| address_offset | contents (msb ... lsb) | | | | | | | |
|---|---|---|---|---|---|---|---|---|
| $0E_{16}$ | repeat_type | | | | | | | |
| $0F_{16}$ | number_of_events | | | | | | | |
| $10_{16}$ | Sunday | Monday | Tuesday | Wednesday | Thursday | Friday | Saturday | Reserved |

FIG.12

| address_offset | contents | |
|---|---|---|
| 0E₁₆ | repeat_type | |
| 0F₁₆ | number_of_events | |
| 10₁₆ | Reserved(4 bits) | Interval:hours(msb) |
| 11₁₆ | interval:hours(lsb) | |
| 12₁₆ | interval:minutes | |
| 13₁₆ | interval:seconds | |

FIG.13

| address_offset | contents |
|---|---|
| 00₁₆ | compound_length |
| 01₁₆ | |
| 02₁₆ | info_block_type |
| 03₁₆ | |
| 04₁₆ | primary_fields_length |
| 05₁₆ | |
| 06₁₆ | number_of_subunits |
| 07₁₆ | subunit_type_and_ID[0] |
| ⋮ | ⋮ |

FIG.14

| character_code_info_block | |
|---|---|
| Adress_offset | Contents |
| 00 00$_{16}$ | compound_length |
| 00 01$_{16}$ | |
| 00 02$_{16}$ | info_block_type=00 08$_{16}$ (character_code_info_block) |
| 00 03$_{16}$ | |
| 00 04$_{16}$ | primary_fields_length |
| 00 05$_{16}$ | |
| 00 06$_{16}$ | character_code_type |
| 00 07$_{16}$ | character_code_type_specific |
| : | |
| : | |

FIG.15

| language_code_info_block | |
|---|---|
| Adress_offset | Contents |
| 00 00$_{16}$ | compound_length |
| 00 01$_{16}$ | |
| 00 02$_{16}$ | info_block_type=00 09$_{16}$ (language_code_info_block) |
| 00 03$_{16}$ | |
| 00 04$_{16}$ | primary_fields_length |
| 00 05$_{16}$ | |
| 00 06$_{16}$ | language_code_type |
| 00 07$_{16}$ | language_code_type_specific |
| : | |
| : | |

FIG.16

| raw_text_info_block ||
|---|---|
| Adress_offset | Contents |
| $00\ 00_{16}$ | compound_length |
| $00\ 01_{16}$ | |
| $00\ 02_{16}$ | info_block_type=$00\ 0A_{16}$ (raw_text_info_block) |
| $00\ 03_{16}$ | |
| $00\ 04_{16}$ | primary_fields_length |
| $00\ 05_{16}$ | |
| $00\ 06_{16}$ | raw_text_data |
| : | |
| : | |

FIG.17

| raw_text_data |
|---|
| CHANNEL |
| PROGRAM TITLE (PROGRAM) |
| CONTROL INFORMATION (REPLAY, RECORDING, STOP, ETC.) |
| REMARKS (PAY PER VIEW) |
| PROVIDER |
| PRELIMINARILY RESERVED |
| |

FIG.18

| opcode | OPEN DESCRIPTOR |
|---|---|
| operand 0 | descriptor_type=$10_{16}$ |
| operand 1 | List ID:$00_{16}$ |
| operand 2 | List ID:$01_{16}$ |
| operand 3 | subfunction WRITE OPEN $03_{16}$ |
| operand 4 | reserved $00_{16}$ |

FIG.22

| | msb | | | | | | lsb |
|---|---|---|---|---|---|---|---|
| opcode | READ DESCRIPTOR ($09_{16}$) ||||||||
| operand 0 | descriptor identifier |||||||
| operand 1 | : |||||||
| : | : |||||||
| : | read_result_status |||||||
| : | reserved : $00_{16}$ |||||||
| : | data_length |||||||
| : | address |||||||

FIG.23

| | msb | | | | | | lsb |
|---|---|---|---|---|---|---|---|
| opcode | | CREATE DESCRIPTOR ($00_{16}$) | | | | | |
| operand 0 | | result | | | | | |
| operand 1 | | subfunction_1 | | | | | |
| operand 2 | | reserved | | | | | |
| operand 3 : : | | subfunction_1_specification | | | | | |

FIG.24

| values of subfunction_1 | meaning |
|---|---|
| $00_{16}$ | create a new descriptor |
| $01_{16}$ | create a new object and its child list |
| all other values | reserved for future specification |

FIG.25

| subfunction_1_specification for subfunction_1=01₁₆ | |
|---|---|
| | msb　　　　　　　　lsb |
| operand 3 | descriptor_identifier_where |
| ⋮ | |
| ⋮ | |
| ⋮ | descriptor_identifier_what_1 |
| ⋮ | |
| ⋮ | |
| ⋮ | descriptor_identifier_what_2 |
| ⋮ | |

FIG.26

| descriptor_type of descriptor_identifier_ where | descriptor_type of descriptor_identifier_ what_1 | descriptor_type of descriptor_identifier_ what 2 | meaning |
|---|---|---|---|
| $20_{16}$ | $22_{16}$ | $11_{16}$ | Create an object and its child list.<br><br>create the new object and place it in the location specified by where, the entry_type is specified by what_1. Also create the new list as the child of the new object. The list_type is specified by what_2. |
| all other values | | | reserved for future specification |

FIG. 27

| opcode | WRITE DESCRIPTOR (OA$_{16}$) |
|---|---|
| operand 0 | descriptor identifier |
| : | subfunction:partial_replace(50$_{16}$) |
| : | group_tag:immediate(00$_{16}$) |
| : | replacement_data_length |
| : | address |
| : | original_data_length |
| : | replacement_data |

FIG.28

| Value | List definition |
|---|---|
| $1001_{16}$ | Resource Schedule List |
| $1002\text{-}10FF_{16}$ | reserved |

FIG.30

| Address_offset | Contents |
|---|---|
| $00_{16}$ | supported_board_type |
| $01_{16}$ | supported_board_type_version |
| $02_{16}$ | implementation_profile_ID |
| $03_{16}$ | supported_board_type_dependent_information_length |
| $04_{16}$ | |
| $05_{16}$ : : | supported_board_type_dependent_information |

FIG.31

| opcode | OPEN DESCRIPTOR |
|---|---|
| operand 0 | descriptor_type=$10_{16}$ |
| operand 1 | List ID:$00_{16}$ |
| operand 2 | List ID:$01_{16}$ |
| operand 3 | subfunction CLOSE $00_{16}$ |
| operand 4 | reserved $00_{16}$ |

INFORMATION PROCESSING DEVICE, INFORMATION PROCESSING METHOD AND MEDIUM

BACKGROUND OF THE INVENTION

1. Field of the Invention

This invention relates to an information processing device adapted to be connected to another information processing device typically by way of an IEEE 1394 serial data bus so as to be able to reliably control the subunits it contains. The present invention also relates to an information processing method and a medium that can be used for such a device.

2. Related Background Art

Recently, there have been developed various AV devices that can mutually transmit information typically by way of an IEEE 1394 serial data bus defined by the IEEE (the Institute of Electrical and Electronics Engineers). Then, the devices that are connected to each other by way of such a bus constitute a network system and it is possible to mutually control the AV devices connected to the network by means of predetermined digital interface commands (AV/C command transaction set: to be referred to as AV/C commands hereinafter).

FIG. 1 of the accompanying drawing shows a schematic block diagram of a network formed by using an IEEE 1394 serial data bus 80 (to be referred to simple as bus 80 hereinafter). In a network system as shown in FIG. 1, it is possible to record a video signal received by an IRD (integrated receiver decoder) 71 adapted to receive digital broadcasts by means of a DVCR (digital video cassette recorder) connected to it by way of the bus 80. It is also possible to make recording reservations by using the IRD 71 and the DVCR 81.

When making a recording reservation by using such devices, both the IRD 71 itself and the DVCR 81 are controlled by the controller 72 typically arranged in the IRD 71. More specifically, the recording reservation is made in the IRD 71 (in terms of preselecting the channel, the time of starting the recording and so on). When the selected start time comes, the controller 72 internally so controls the digital tuner subunit 73 in the IRD 71 as to cause it actually select the preselect (reserved) channel and output the video signal and other relates signals received by the digital tuner subunit 73 out of the signals caught by CS antenna 74 to the DVCR 81 by way of the bus 80. At the same time, a recording start command is transmitted from the controller 72 to VCR subunit 84 arranged in the DVCR 81 also by way of the bus 80. Then, the VCR subunit 84 records the video signal transmitted from the digital tuner subunit 73 on a recording medium, which may be a magnetic tape, in response to the recording start command transmitted from the controller 72. In this way, the network of FIG. 1 can record a broadcast according to a recording reservation made for it.

The DVCR 81 is also provided with a controller 82 that controls the operation of recording the video signal received by the analog tuner subunit 83 it contains by mean of a VCR subunit 84.

Electronic devices such as the IRD 71 and the DVCR 81 that are connected to the bus 80 are referred to as units and it is possible to mutually write information to and read any information from any of the units by using a descriptor defined by the general specification of the AV/C command (AV/C command transaction set) (AV/C digital interface command set general specification, which is to be referred to as AV/C general hereinafter). Details of the AV/C general are published and accessible by accessing home page "http://www.1934ta.org/". Each of the features of a unit is referred to as subunit. In the instance of FIG. 1, there are shown subunits including the digital tuner subunit 73 of the IRD 71 and the VCR subunit 84 if the DVCR 81. There can arise a problem of so-called double booking in a network system as described above in which it is possible to control the operation of the DVCR 81 by some other device connected to it by way of the bus 80 (the IRD 71 in the instance of FIG. 1).

For example, if a recording reservation (recording reservation A) is made for a digital satellite broadcast by way of the IRD 71, the information on the reservation is stored in the controller 72 of the IRD 71. However, since the AV/C command for the recording reservation is not transmitted from the IRD 71 to the DVCR 81 at this time (or at any time before the start of the broadcast for which the recording reservation is made), the DVCR 81 does not known that a recording reservation is made for the broadcast at the IRD 71. If, thereafter, a recording reservation (recording reservation B) is made at the DVCR 81 for an analog terrestrial broadcast that is put on air simultaneously, if partly, with the broadcast of the recording reservation A, the DVCR 81 accept the recording reservation B and stores in it because the controller 82 of the DVCR 81 does not have the information on the recording reservation A made at the IRD 71 and hence does not know that two recording reservations are made for different broadcasts that are put on air simultaneously.

Then, as the time specified by the recording reservation A and the recording reservation B comes, the VCR subunit 84 of the DVCR 81 receives two vide signals, one from the digital tuner subunit 73 of the IRD 71 and one from the analog tuner subunit 83 of the DVCR 81, and is controlled by both the controller 72 of the IRD 71 and the controller 82 of the DVCR 81 to make the VCR subunit 84 of the DVCR 81 at a loss.

Such a problem can occur in a conventional network system having a configuration as described above due to the fact that any of the AV devices (units) connected to the bus 80 cannot obtain detailed information on the recording reservations of all the other AV devices of the system, that each of the AV devices does not have any means for providing the other AV devices of the system with the detailed information on the recording reservations it has, that any of the users of the system cannot know the detailed information on reservations stored in the system when he or she makes a recording reservation and that any of the AV devices or the users cannot input detailed information on a recording reservation.

BRIEF SUMMARY OF THE INVENTION

In view of the above circumstances, it is therefore the object of the present invention to provide an information processing device, an information processing method and a medium with which any of the AV devices or the users of a network system of the type under consideration can input detailed information on a recording reservation and provide the remaining AV devices and the users with the detailed information on the recording reservations that the AV device or the user has and it is possible to realize a means to be used by any of the AV devices or the users to provide the remaining AV devices and the users with the detailed information on the recording reservations that the AV device or the user has. Such a system can effectively avoid occurrence of so-called double booking and is easy to use for the users.

According to the invention, the above object is achieved by providing an information processing device adapted to be connected to other information processing devices by way of a network and comprising:

at least one or more than one function execution means for executing a predetermined function;

a storage means for storing a first piece of information on the schedule of operation of said function execution means;

an acquisition means for acquiring a second piece of information on the schedule of operation of said function execution means not contained in said first piece of information; and a control means for putting said second piece of information into a predetermined block format and storing it in said storage means as additional information to said first piece of information.

In another aspect of the invention, there is also provided an information processing method to be used for an information processing device adapted to be connected to other information processing devices by way of a network and having at least one or more than one function execution means for executing a predetermined function and a storage means for storing a first piece of information on the schedule of operation of said function execution means, said method comprising:

acquiring a second piece of information on the schedule of operation of said function execution means not contained in said first piece of information; and putting said second piece of information into a predetermined block format and storing it in said storage means as additional information to said first piece of information.

In still another aspect of the invention, there is provided a medium adapted to make an information processing device to execute a program comprising:

a step of acquiring a second piece of information on the schedule of operation of said function execution means not contained in said first piece of information; and a step of putting said second piece of information into a predetermined block format and storing it in said storage means as additional information to said first piece of information.

Thus, with an information processing device, an information processing method and/or a medium according to the invention, it is possible for any of the users or the devices of a network system of the type under consideration to obtain detailed information on the recording reservations of the devices by acquiring a second piece of information on the schedule of operation of any function execution means not contained in a first piece of information relating to the scheduled use of the function execution means and putting said second piece of information into a predetermined block format and storing it in the storage means of the function execution means as additional information to said first piece of information.

Therefore, according to the invention, it is possible to display a warning of any instance of double booking of recording reservations to the user and clearly show the cause of the double booking. Additionally, according to the invention, it is possible to make a preliminary reservation in an information processing device connected to a network system of the type under consideration with a notice that the reservation may be overridden by an appropriate operation on the part of any of the users of the network system such as that of cancelling the reservation and making another reservation because the original reservation is a preliminary reservation. Still additionally, while it is a common practice to display the summary of a reservation in a DVCR when the reservation is confirmed, according to the invention, summaries of the reservations of the other devices of the network system can also be displayed with the information for the confirmation regardless if the other devices are external relative to the DVCR.

BRIEF SUMMARY OF THE SEVERAL VIEWS OF THE DRAWING

FIG. 5 is a schematic illustration of the format of Write Enabled list_specific_information;

FIG. 9 is a schematic illustration of the format of start_time of FIG. 8;

FIG. 10 is a schematic illustration of the format of the Duration of FIG. 8;

FIG. 11 is a schematic illustration of the format of repeat_type of FIG. 8;

FIG. 12 is a schematic illustration of the format of repeat_information when a given schedule is repeated every week;

FIG. 13 is a schematic illustration of the format of repeat_information when a given schedule is repeated at predetermined regular intervals;

FIG. 14 is a schematic illustration of the format of the Info blocks of FIG. 8;

FIG. 15 is a schematic illustration of the format of character_code_information_block of the Resource Schedule Entry of FIG. 8;

FIG. 16 is a schematic illustration of the format of language_code_information_block of the Resource Schedule Entry of FIG. 8;

FIG. 17 is a schematic illustration of the format of raw_text_information_block of the Resource Schedule Entry of FIG. 8;

FIG. 18 is a schematic illustration of an example of raw_text_data described in the raw_text_information_block of FIG. 17;

FIG. 22 is a schematic illustration of the format of the write open command to be used for the purpose of the invention;

FIG. 23 is a schematic illustration of the format of the read command to be used for the purpose of the invention;

FIG. 24 is a schematic illustration of the format of the create command to be used for the purpose of the invention;

FIG. 25 is a schematic illustration of subfunction_1 of FIG. 13;

FIG. 26 is a schematic illustration of details of subfunction_1 of FIG. 25;

FIG. 27 is a schematic illustration of examples of values of the fields of FIG. 26;

FIG. 28 is a schematic illustration of the format of the write descriptor command to be used for the purpose of the invention;

FIG. 30 is a schematic illustration of root_object_list_ID;

FIG. 31 is a schematic illustration of supported_board_type_specific_information of the BBS of FIG. 29;

DETAILED DESCRIPTION OF THE INVENTION

Now, the present invention will be described by referring to the accompanying drawings that illustrate preferred embodiments of the invention. The term "system" as used herein refers to an overall arrangement formed by using a plurality of devices and means.

Figure 1:
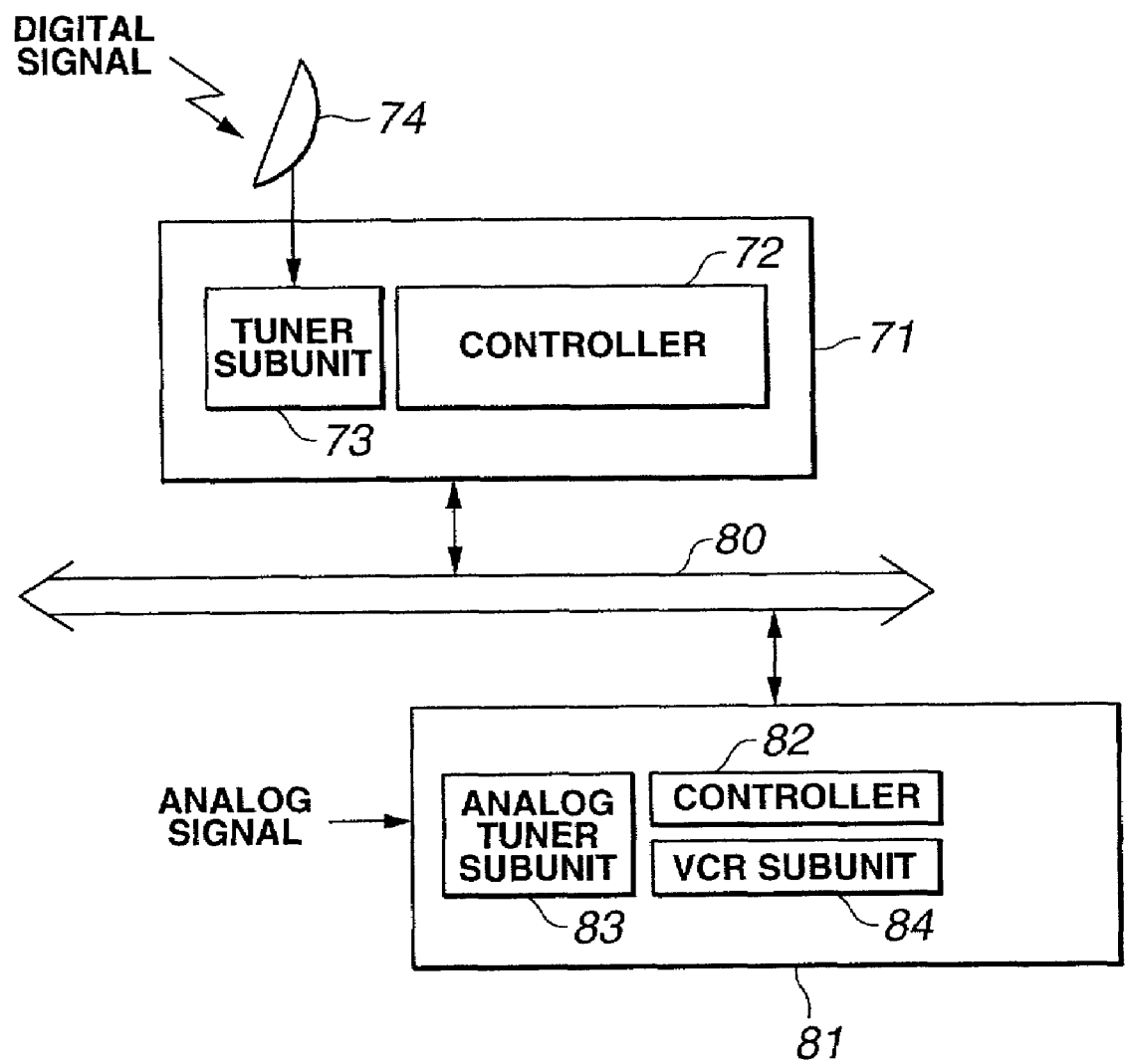
FIG. 1 is a schematic block diagram of a known network system of the type under consideration.
Figure 2:
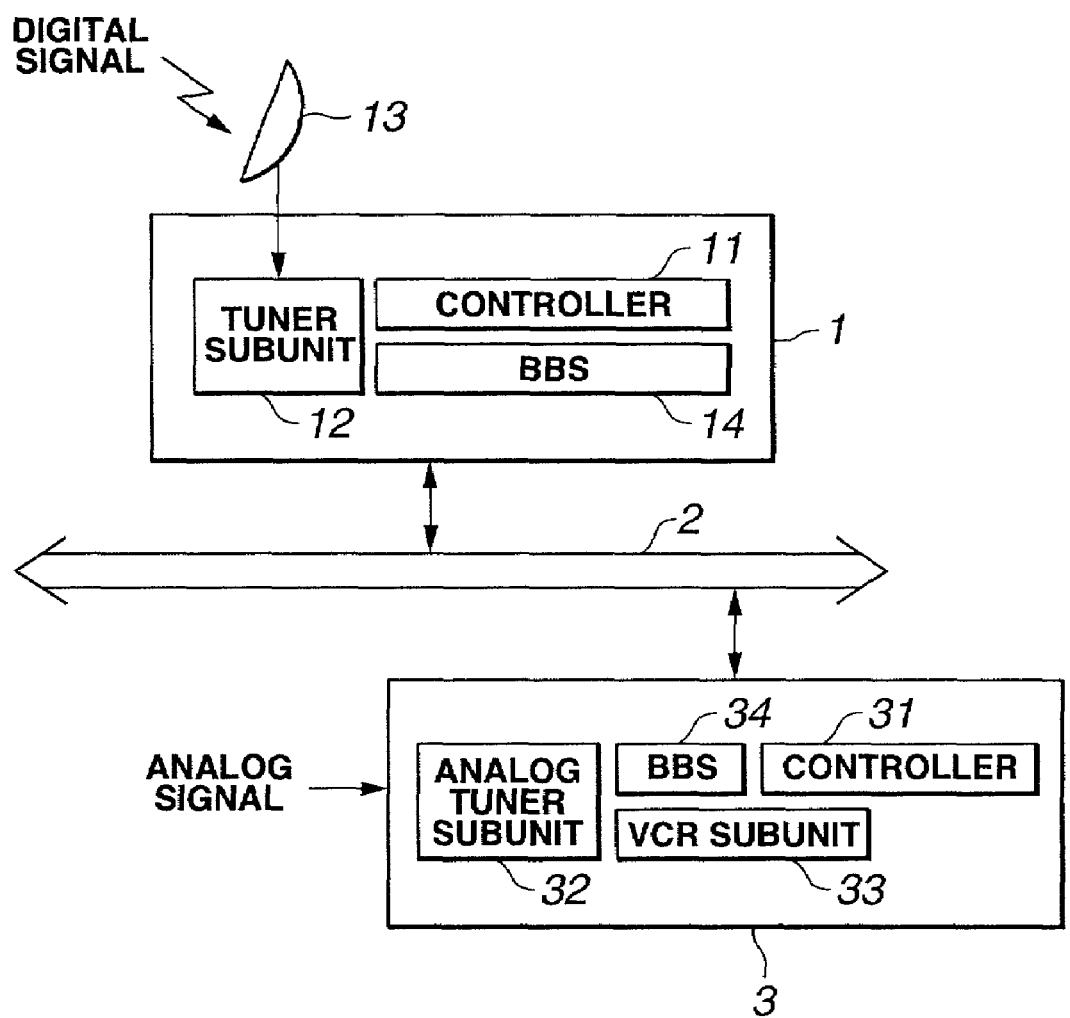
FIG. 2 is a schematic block diagram of a network system to which an embodiment of the present invention is applicable.

FIG. 2 is a schematic block diagram of a network system to which an embodiment of the present invention is applicable.

The network system illustrated in FIG. 2 comprises IRD 1 and DVCR (e.g., a recorder typically adapted to D-VHS) 3 that are connected to each other by way of an IEEE 1394 serial data bus 2 (to be referred to simple as bus 2 hereinafter). It may be appreciated that, beside the IRD 1 and the DVCR 3, any other one or more than one electronic devices selected from personal computers, hard disk drives, CD players, monitors, digital video cameras and MD (tradename) players that are provided with an IEEE 1394 terminal can also be connected to the bus 2.

Referring to FIG. 2, the controller 11 of the IRD 1 is adapted to receive user inputs for channel selections and recording reservations and controls the entire IRD 1. The controller 11 also controls the DVCR 3 by using the above described AV/C command as predetermined dig interface command. Also referring to FIG. 2, the CS antenna 13 receives the digital signals of digital satellite broadcasts transmitted by way of a communication satellite (not shown) and outputs them to tuner subunit 12. The tuner subunit 12 extracts the signal of the desired channel out of the digital signals input from the CS antenna 13 and outputs it to the VCR subunit 33 by way of the bus 2 under the control of the controller 11. Additionally, the controller 11 is able to retrieve and check any information recorded in the BBS (bulletin board subunit) 34 of the DVCR 3.

The BBS 14 that is one of the subunits of the IRD 1 stores the information that is received and finalized by the controller 11 and may be information on a recording reservation, (as will be described in greater detail hereinafter by referring to FIG. 3).

The controller 31 of the DVCR 3 is adapted to receive user inputs for replay operations and recording reservations and controls the entire DVCR 3. The controller 31 is also able to retrieve and check any information recorded in the BBS 34. The analog tuner subunit 32 extracts the signal of the desired channel out of the input analog signals and outputs it to the VCR subunit 33 by way of the bus 2 under the control of the controller 31.

The VCR subunit 33 records the video signal input from the analog tuner subunit 32 or the video signal input from the tuner subunit 12 of the IRD 1 by way of the bus 2 on a magnetic tape (not shown).

The BBS 34 stores the information on the recording reservations relating to the DVCR 3 (as will be described in greater detail hereinafter by referring to FIG. 3).

When the user wants to make a recording reservation for a digital satellite broadcast by means of the network system of FIG. 2, he or she firstly inputs specific data (of the channel to be selected and the time for starting the recording) for the recording reservation to the IRD 1. If the time and the channel have not been input yet, the input specific data are acknowledged for the recording reservation and written in the BBS 14 of the IRD.

If the user inputs the recording reservation to the IRD 1, the controller 11 of the IRD 1 holds Scheduled Actions 1 through n that include the data specified for the recording reservation in an internal register. More specifically, the Scheduled Actions include Scheduled Data 52 and Program 53, of which the Scheduled Data 52 by turn include information on the recording start time, information on the duration and repeat information and information on the subunits to be used (Resources used), whereas the Program 53 includes Commands 1 through n for actually controlling the subunits. The Contents of the Scheduled Data 52 (Resource Schematic Object) are sent from the controller 11 of the IRD 1 and written into the BBS 34 of the DVCR 3 when the recording reservation input by the user is finalized. On the other hand, the commands of the above Program 53 are sent to the respective subunits (subunits A, B, ..., n that are actually used for the recording) of the DVCR 3 when the recording start time of the recording reservation comes and the recording operation is actually carried out.

Figure 3:
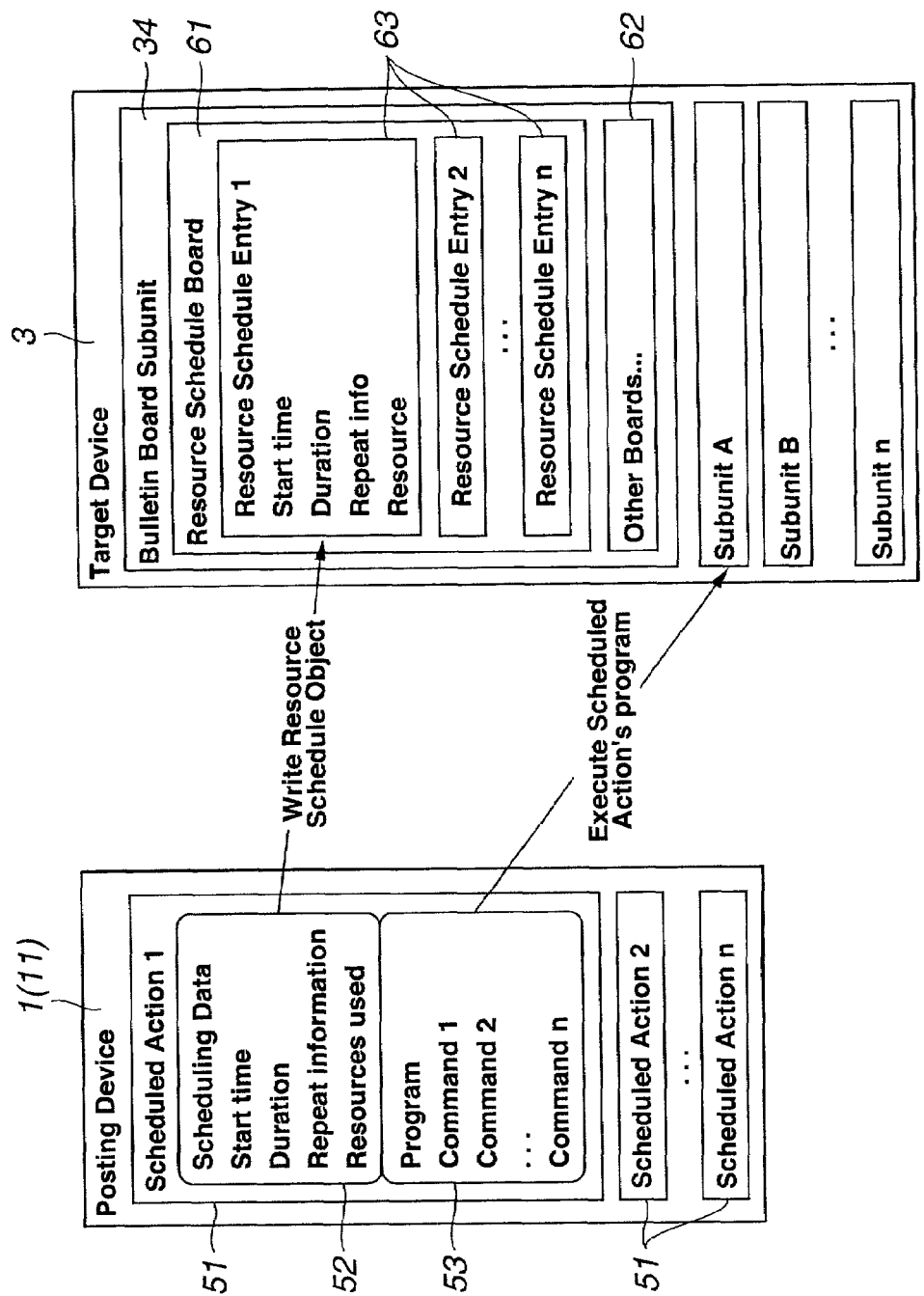
FIG. 3 is a schematic block diagram of a network system to which an embodiment of the present invention is applicable and where a posting device is adapted to control the RSB of the BBS of the target device.

As shown in FIG. 3, the BBS 34 of the DVCR 3 comprises RSB (Resource Schedule Board) 61 and other boards 62. The RSB 61 is a form for entering the schedule of using resources including information on recording reservations in the BBS 34. Note that the entries of the RSB 61 that are written and to be read out simply show the schedule of using resources and are not used for reserved controlling operations. The entries of the RSB 61 may typically include the objects (such as Start times, Durations, Repeat information, Resources) of the Scheduled Data 52 sent from the controller 11 of the IRD 1 and the objects of the Scheduled data sent from any of the units (including the controller 31 of the DVCR 3), which are written as Resource Scheduled Entries (1 through n) 63.

The information written into the BBS 34 of the DVCR 3 is exposed not only to the controller 11 of the IRD 1 but also to all the controllers of the other units (including the controller 31 of the DVCR 3).

Figure 4:
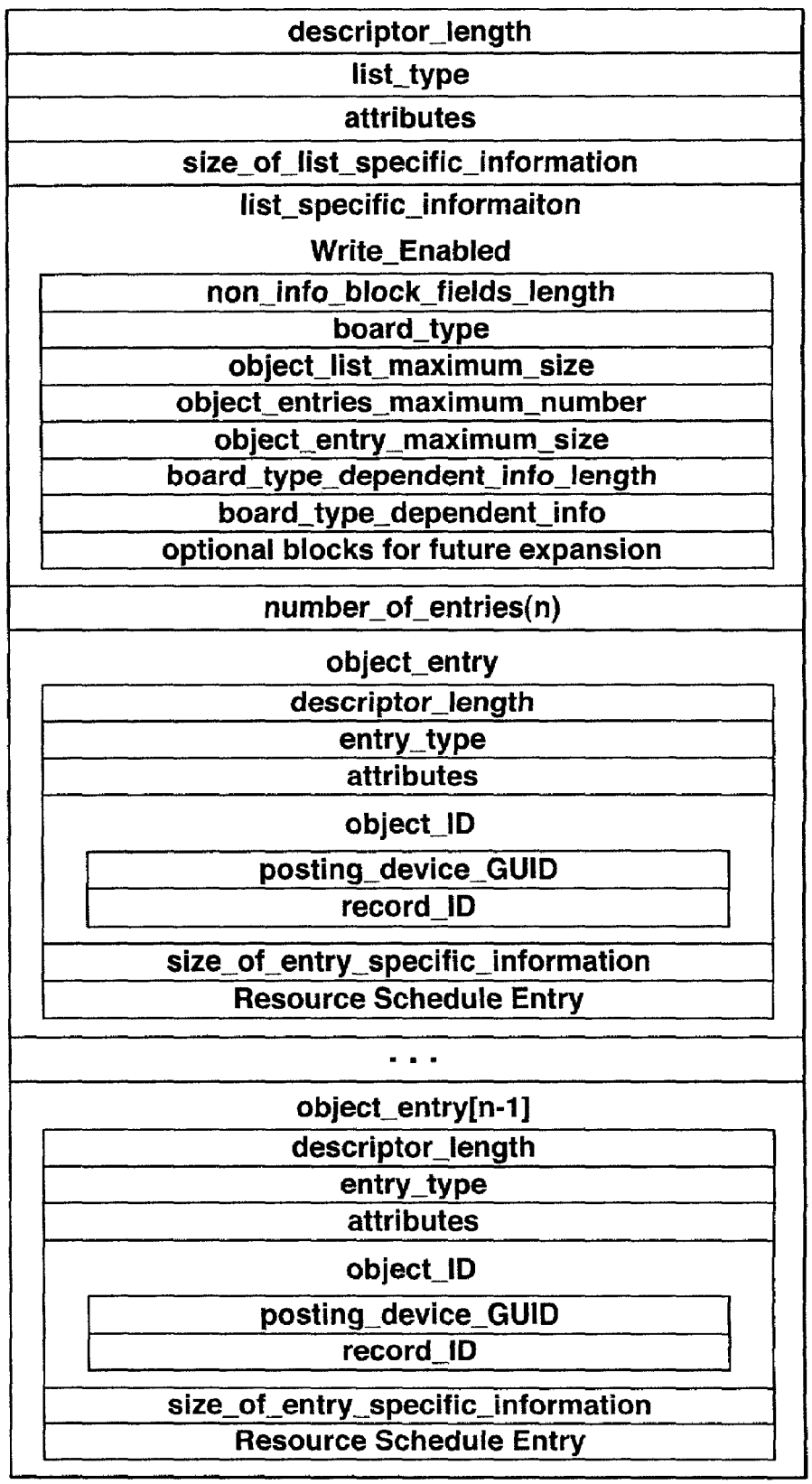
FIG. 4 is a schematic illustration of the format of the RSB of the BBS of FIG. 3.

FIG. 4 schematic illustrates the format of the RSB of the BBS.

In FIG. 4, descriptor_length shows the length of the RSB and list_type describes if the RSB is of the type of read only or of that of write enabled, while size_of_list_specific_information shows the length of list_specific_information, which list_specific_information may vary depending on list_type.

Figures 6, 7:
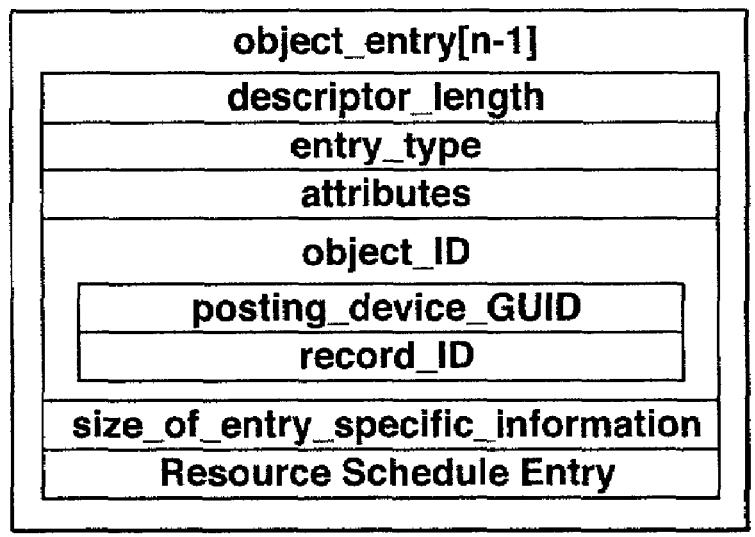
FIG. 6 is a schematic illustration of the format of board_type of FIG. 5.
FIG. 7 is a schematic illustration of the format of object_entry of FIG. 4.

The information as shown in FIG. 5 is written in Write Enabled list_specific_information, of which non_info_block_fields_length shows the number of bytes of non info block fields. In the case of an RSB, board_type is expressed by "$01_{16}$" as shown in FIG. 6. In FIG. 5, object_list_maximum_size shows the largest size of the object list and object_entry_maximum_number shows the largest number of the object entries, while object_entry_maximum_size shows the size of the largest object entry. If no limitations are provided respectively for object_list_maximum_size, object_entries_maximum_number and object_entry_maximum_size, they are expressed by "$0000_{16}$". The above three fields are useful for the controllers to know the capacity of the object list and/or the object entries. In FIG. 5, board_type_dependent_information_length shows the length of the board_type_dependent_information, while board_type_dependent_information shows the information specific to the board type.

Now, referring to FIG. 7, object_entry is described in a manner as shown there. In FIG. 7, descriptor_length of object_entry shows the length of the descriptor and, in the case of Board entry Descriptor, entry_type is made to have a value of "$80_{16}$" that represents the Board. In FIG. 7, object_ID includes posting_device_GUID and record_ID and posting_device indicates the controller that describes the information (post) to the BBS. Therefore, posting_device_GUID indicates its GUID, whereas record_ID indicates the ID assigned to Event in the unit and size_of_entry_specific_information shows the size of Resource Schedule Entry as entry_specific_information.

Figure 8:
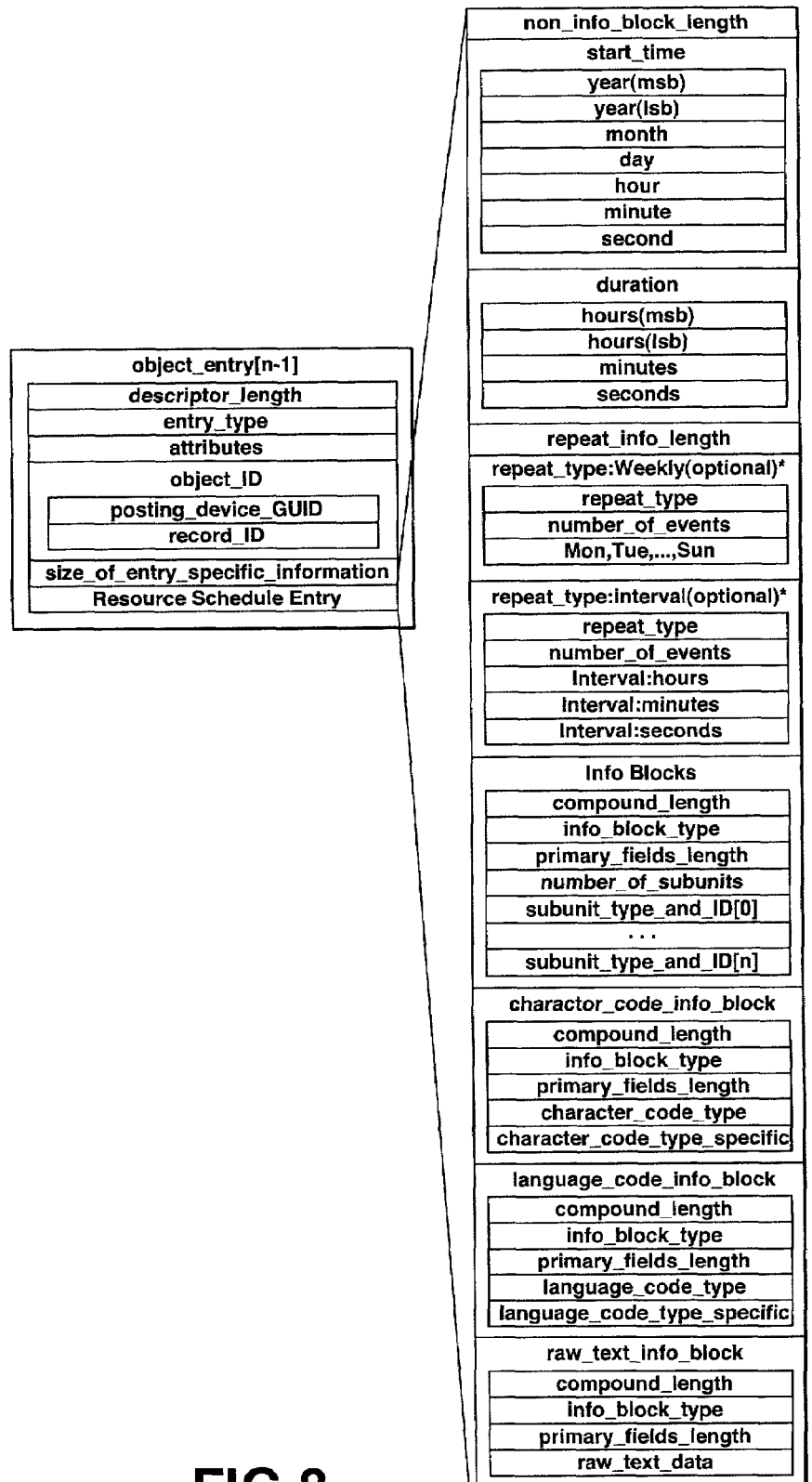
FIG. 8 is a schematic illustration of the format of the Resource Schedule Entry of FIG. 7.

Information as shown in FIG. 8 is written in Resource Schedule Entry.

Referring to FIG. 8, non_info_block_length indicates the number of bytes of the non info block fields down to repeat_information. As shown in FIG. 9, start_time shows the date (year, month, day) and the time (hour, minute, second) when the event (which is a recording reservation in this example) starts. The year is expressed by 16 bits. In other words, each of the four digits of the year is expressed by a 4-bit BCD (Binary Coded Decimal). The month is expressed by 8 bits. In other words, each of the two digits of the month, which are any of 01 through 12, is expressed by a 4-bit BCD. The day is expressed by 8 bits, In other words, each of the two digits of the day, which are any of 01 through 31, is expressed by a 4-bid BCD. The hour is also expressed by 8 bits. In other words, each of the two digits of the hour, which are any of 00 through 24, is expressed by a 4-bit BCD. The minute is expressed by 8 bits. In other words, each of the two digits of the minute, which are any of 00 through 60, is expressed by a 4-bit BCD. Finally, the second is also expressed by 8 bits. In other words, each of the two digits of the second, which are may of 00 through 60, is expressed by a 4-bit BCD. As start_time is expressed by BCDs, it can be identified with ease. The time is expressed in local time.

The Duration of the Event is expressed in terms of hours, minutes and seconds as shown in FIG. 10. More specifically, the hours are expressed by three digits, each of which is expressed by a 4-bit BCD, so that the total number of bits is equal to 12. The minutes are expressed by two digits, each of which is expressed by a 4-bit BCD, so that the total number of bits is equal to 8. The seconds are expressed also by two digits, each of which is expressed by a 4-bit BCD, so that the total number of bits is equal to 8. The time at which the Event ends can be obtained by adding the Duration to start_time. With this arrangement of expressing the time when the Event ends not directly but by using the Duration, any operation of correcting the time when the Event ends is not necessary if start_time of the Event is altered so that the processing operation for any alteration can be simplified.

Note that repeat_information_length shows the length of repeat_information. In this embodiment, repeat_information shows how the schedule (of recording reservations in this case) is repeated. If no Scheduled Action is repeated, repeat_information_length is made equal to "$00_{16}$". It will be appreciated that repeat_information varies depending on the selected repeat_type.

As shown in FIG. 11, there are a Weekly Schedule expressed by "$00_{16}$" and an Interval Schedule also expressed by "$00_{16}$". If a schedule is repeated on a weekly basis, the Posting Device (which is the controller 11 of the IRD 1 in this example) displays the number of events of each week and the day of the week of each event in a manner as shown in FIG. 11. Referring to FIG. 11, "$00_{16}$" is described for repeat_type. The Weekly flags for Sunday through Saturday shows the days of the week the respective events are repeated. For example, if an event (a recording reservation in this example) that starts at 13:00 hours for a duration of 3 hours starts on Monday and Wednesday every week, "1" is selected fro the flag of Monday and that of Wednesday while "0" is selected fro the flags of the remaining days. As the events that are repeated on a weekly basis are recorded in repeat_type, the memory capacity necessary for storing the data can be reduced if compared with a case where the data for the absolute date and time of the events (which is a simple repetition of a same event) of the broadcast have to be stored for so many Mondays and Wednesdays.

If a Scheduled Action is repeated at predetermined regular intervals, the Posting Device (which is the controller 11 in this example) describes the event in a format as shown in FIG. 13. Referring to FIG. 13, "$00_{16}$" is described for repeat_type that is shown in FIG. 11. The number of events is described in number_of_events and interval shows the inverval between start_time of the current event and start_time of the next event. The interval is expressed in terms of hours, minutes and seconds. The hours are expressed by three digits, each of which is expressed by a 4-bit BCD, so that the total number of bits is equal to 12. The minutes are expressed by two digits, each of which is expressed by a 4-bit BCD, so that the total number of bits is equal to 8. Similarly, the seconds are expressed also by two digits, each of which is expressed by a 4-bit BCD, so that the total number of bits is equal to 8. Any cyclically repeated events can be stored by using repeat_type to reduce the necessary storage capacity if compared with the case where the data for the absolute date and time of the events (which is a simple repetition of a same event) of the broadcast have to be stored separately.

The info Blocks shown in FIG. 8 is formatted in a manner as shown in FIG. 14.

Referring to FIG. 14, compound_length shows the byte length of the info block. Note, however, that the byte length does not include the length field itself. In FIG. 14, info_block_type is set to "$8900_{16}$" and primary_field_length shows the number of bytes of number_of_subunits and subunit_type_and_ID field, of which number_of_subunits shows the number of subunits that the Posting Device (controller 11 in this example) and subunit_type_and_ID specifies the subunit to be used by the Posting Device.

In the case of this embodiment, character_code_information_block shown in FIG. 15, language_code_information_block also shown in FIG. 15 and raw_text_information_block shown in FIG. 17 are described in the Resource Schedule Entry of FIG. 8.

Referring to FIG. 15, the information on the character code that is used for encoding raw_text_data of raw_text_information_block as shown in FIG. 17 is described in character_code_information_block. In FIG. 15, compound_length indicates the byte length of character_code_information_block. Note, however, that the byte length does not include the length field itself. In FIG. 15, info_block_type is set to "$0008_{16}$" to indicate character_code_information_block and primary_fields_length indicates the number of bytes of character_code_type and character_code_type_specific field, of which character_code_type shows the type of character code and character_code_type_specific shows the specification of character code.

Referring now to FIG. 16, the information on the language code that is used for encoding raw_text_data of raw_text_information_block as shown in FIG. 17 is described in language_code_information_block. In FIG. 16, compound_length indicates the byte length of language_code_information_block. Note, however, that the byte length does not include the length field itself In FIG. 16, info_block_type is set to "$0009_{16}$" to indicate langauge_code_information_block and primary_fields_length indicates the number of bytes of language_code_type and language_code_type_specific field, of which language_code_type shows the type of language code and language_code_type_specific shows the specification of language code.

Referring to FIG. 17, compound_length in raw_text_information_block indicates the byte length of raw_text_information_block. Note, however, that the byte length does not include the length field itself. In FIG. 17, info_block_type is set to "$000A_{16}$" to indicate raw_text_information_block and primary_field_length indicates the number of bytes of raw_text_data. As shown in FIG. 18, information relating to the recording reservation including the channel, the program title, the control information (text on replay, recording, stop, etc.), the remarks (e.g., pay per view program or not), the name of the service provider and if the reservation is preliminary or not are described as raw_text_data.

In the network system of FIG. 2 to which the present invention is applicable, character_code_information_block, language_code_information_block and raw_text_information_block are defined as information blocks and, therefore, it is possible to write various additional information relating to recording reservations such as the devices to be used for recording as text data and any of the text data can be read by the controllers of the units of the network system.

Thus, in the network system of FIG. 2 to which the present invention is applicable, any of the users and the devices of the system can input information on recording reservations, acquire information on the recording reservations made by the remaining users and devices and inform them with the information he, she or it has on recording reservations.

Figure 19:
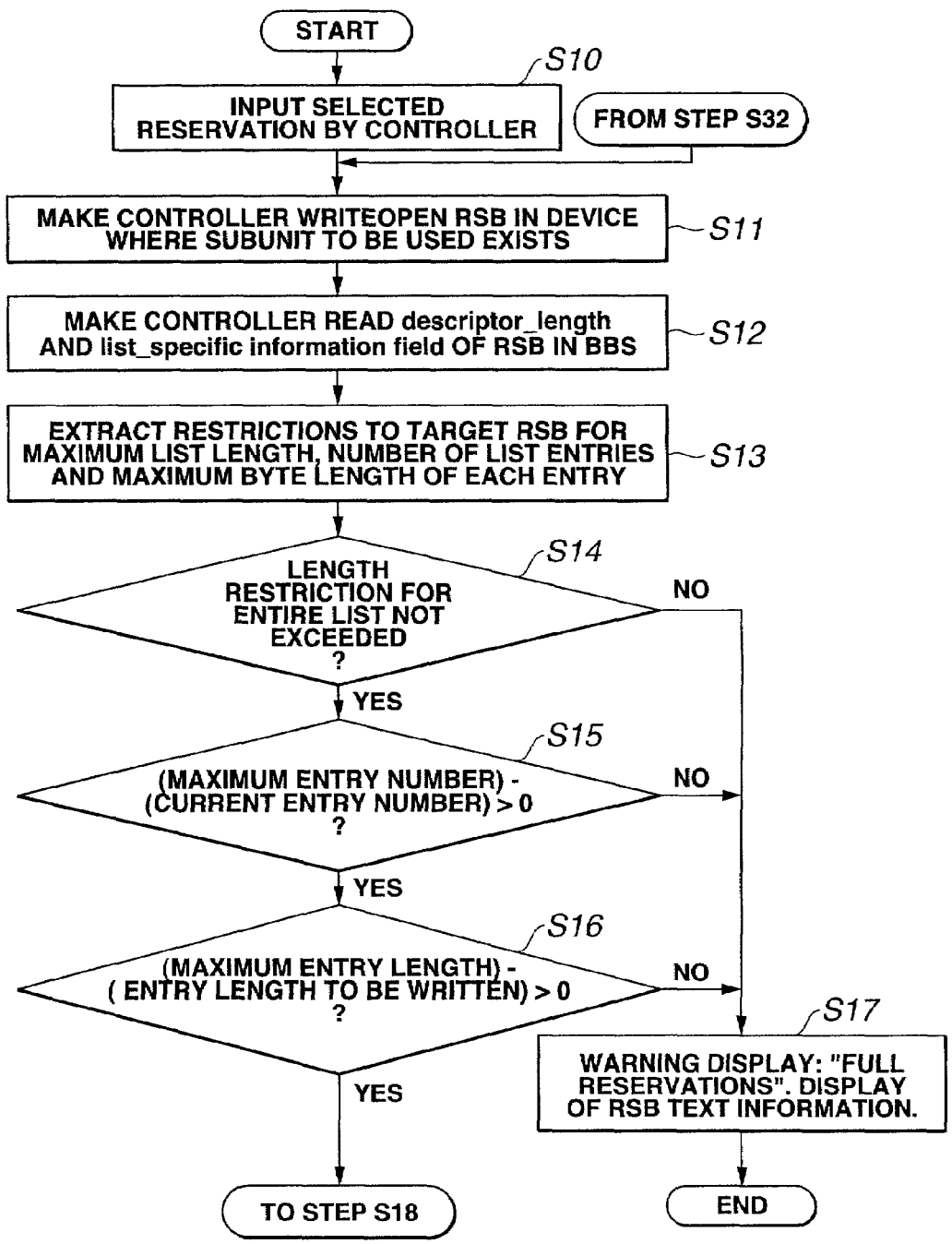
FIG. 19 is a flow chart of the operational procedure for checking if the user can write in the RSB of the device of the network system of FIG. 2 that he or she wants to use.
Figure 20:
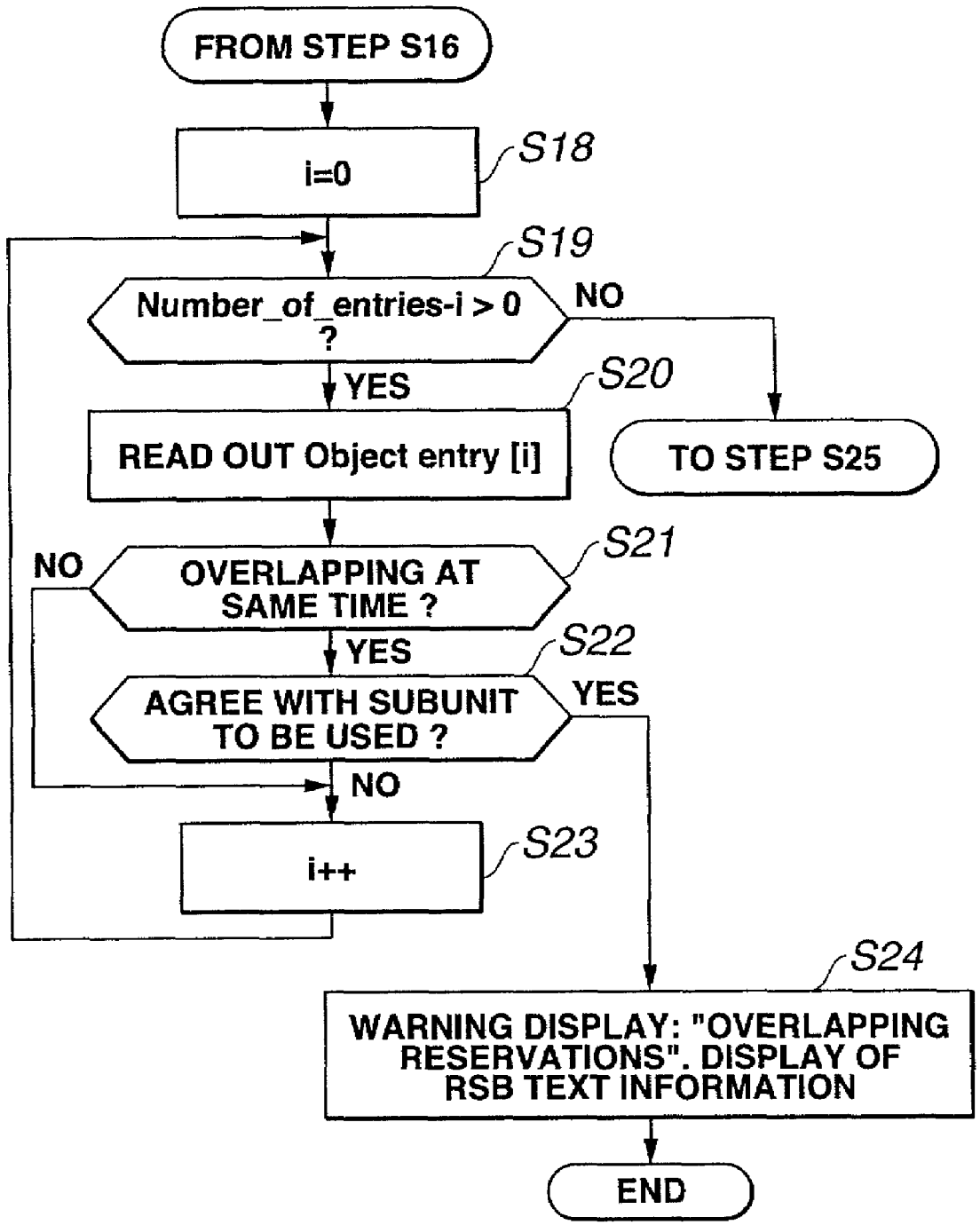
FIG. 20 is a flow chart of the operational procedure for checking if the resource to be used is reserved by some other device of the network system of FIG. 2.
Figure 21:
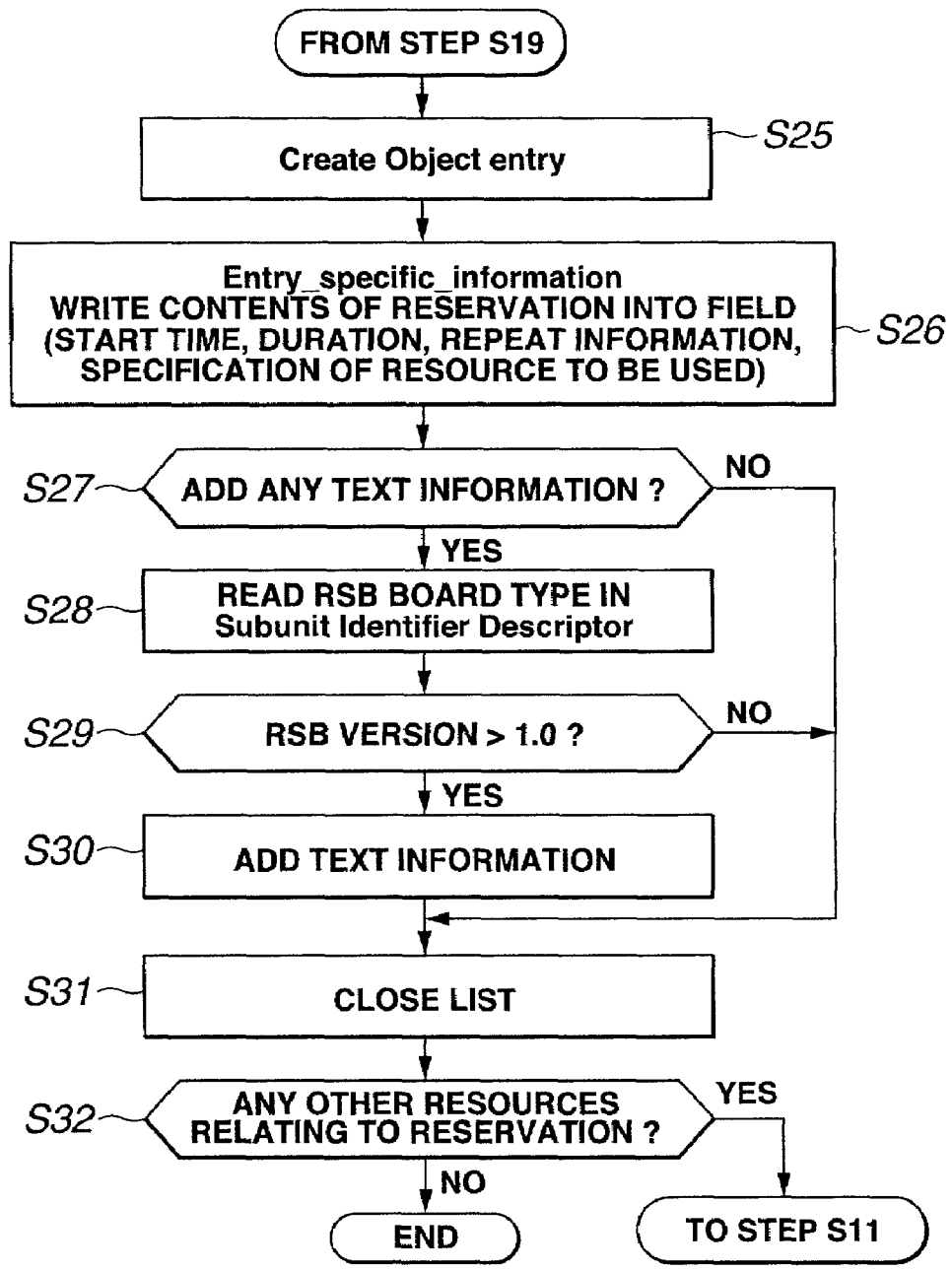
FIG. 21 is a flow chart of the operational procedure for writing the schedule for the use of the resources of the network system of FIG. 2.

FIGS. 19 through 21 illustrate the procedure to be followed when inputting, acquiring or notifying information on a recording reservation and related information in a network system to which the present invention is applicable. Note that, a plurality of resources, or subunits, are related to the recording reservation, the processing operation of FIGS. 19 through 21 is conducted sequentially on a subunit by subunit basis.

Steps S10 through 17 illustrated in the flowchart of FIG. 19 are those for checking if information can be written into the RSBs of the devices to be used. Since the subunits to be used for the recording reservation are the tuner subunit 12 of the IRD 1 and the VCR subunit 33 of the DVCR 3 in the case of the network system of FIG. 2, the controller 11 of the IRD 1 firstly checks if information can be written into the RSB in the BBS 14 of the IRD 1.

Referring to FIG. 19, when a user inputs the date and time and the channel for a recording reservation, the controller 11 of the IRD 1 temporarily stores the reservation related information in the internal register in Step S10.

Then, in response to the input for the recording reservation, the controller 11 causes the RSBs in the devices where the subunits to be used for the recording reservation are found to become WRITE OPEN (and enabled for a write operation) in Step S11. In the case of FIG. 2, the subunits to be used for the recording resource are the tuner subunit 12 of the IRD 1 and the VCR subunit 33 of the DVCR 3. Therefore, firstly, the controller 11 causes the RSB in the BBS 14 of the IRD 1 that is the unit having the tuner subunit 12 to become WRITE OPEN (and enabled for a write operation). The processing operation of causing the RSB 61 in the BBS 34 of the DVCR 3 that is the unit having the VCR subunit 33 to become WRITE OPEN as shown in FIGS. 19 through 21 is conducted after the processing operation for the RSB of the IRD 1.

FIG. 22 shows the format of the WRITE OPEN command to be output from the controller 11 when the latter causes the RSB to become WRITE OPEN. Note that, however, when the RSB of the BBS 14 of the IRD 1 is made to become WRITE OPEN, the controller 11 controls the BBS 14 as if a WRITE OPEN command is fed by way of the bus 2 although both the BBS 14 and the controller 11 are arranged inside the IRD 1 and no bus is required to connect them. When the RSB 61 of the BBS 34 of the DVCR 3 is made to become WRITE OPEN after the processing operation of FIGS. 19 through 21 conducted for the RSB of the IRD 1, a WRITE OPEN command having a format as shown in FIG. 22 is output from the controller 11 and sent to the BBS 34 of the DVCR 3 (the controller 31 controlling the BBS 34 to be more accurate) by way of the bus 2.

The WRITE OPEN command shown in FIG. 22 is a sort of OPEN DESCRIPTOR command to be used when accessing a predetermined address space of the target (the RSB of the BBS in this example). In the WRITE OPEN command of FIG. 22, a value of "$08_{16}$" representing an open descriptor is described in opcode and a value of "$10_{16}$" representing an Object List Descriptor defined by a list ID is described in operand 0 as descriptor_type showing the type of the descriptor to be used for WRITE OPEN. The list ID (in this example, "00" and "01") of the RSB to be accessed (to be made to become WRITE OPEN) is described in operand 1 and operand 2. Then, a value of "$03_{16}$" representing WRITE OPEN for opening for the purpose of an access for reading or writing a descriptor is described in operand 3 as subfunction. A value of "00" is written in operand 4 to show it is reserved.

Then, the controller 11 proceeds to Step S12, where it reads out the information on descriptor_length and list_specific_information field in the RSB of the BBS 14 of the IRD 1. Note that the processing operation of reading information from the RSB 61 of the BBS 34 of the DVCR 3 is conducted after the processing operation of FIGS. 19 through 21 for the RSB of the IRD 1.

FIG. 23 shows the format of the READ command to be used for reading the RSB of the controller 11. When reading the RSB of hte BBS 14 of the IRD 1, the controller 11 controls the BBS 14 as if a READ command is fed by way of the bus although both the BBS 14 and the controller 11 are arranged inside the IRD 1 and no bus 2 is required to connect them. When the RSB 61 of the BBS 34 of the DVCR 3 is made to become READ OPEN after the processing operation of FIGS. 19 through 21 conducted for the RSB of the IRD 1, a READ OPEN command having a format as shown in FIG. 23 is output from the controller 11 and sent to the BBS 34 of the DVCR 3 (the controller 31 controlling the BBS 34 to be more accurate) by way of the bus 2.

In the format of the READ OPEN command of FIG. 23, a value of "$09_{16}$" representing a read descriptor is described in opcode at the top and a descriptor identifier for identifying the descriptor to be read is described in operated 0. In the case of a processing operation for read in Step S12, a descriptor identifier, or a list ID, is described. More specifically, any of "$00_{16}$" through "$0D_{16}$" of Address_offset of write enabled list_specific_information field as shown in FIG. 5 is described. Additionally, "$FF_{16}$" is described as read_result_status when the Posting Device transmits a READ command and the result of the reading operation is described when the target (the RSB of the BBS in this example) sends back its response. The number of bytes of the data to be read from the target is described as data_length. Note that all the list is read out if a value of "$00_{16}$" is selected for the number of bytes. The address from which the read operation start is described as address. The read operation start from the top if a value of "$00_{16}$" is selected for the address.

Thereafter, the controller 11 proceeds to Step S13, where it extracts the permissible largest size of the list (object_list_maximum_size of FIG. 5), the permissible largest number of entries of the list (object entries_maximum_number of FIG. 5) and the permissible largest byte length (object_entry_maximum_size of FIG. 5) for the RSB in the BBS 14 of the IRD 1, which is the current target.

Then, the controller 11 proceeds to Step S14, where it determines if the permissible largest size (object_list_maximum_size) of the list is exceeded or not when the data (including the information on the recording reservation in the case of this example) is recorded in the RSB in the BBS 14 of the IRD 1. The controller proceeds to Step S15 if it is determined in Step S14 that the permissible largest size (object_list_maximum_size) of the list is not exceeded, whereas the controller 11 proceeds to Step S17 if it is determined in Step S14 that the permissible largest size (object_list_maximum_size) of the list is exceeded.

In Step S15, the controller 11 determines if the permissible largest number of entries (object_entries_maximum_number) of the list extracted in Step S13 is exceeded or not and, in other words, if the difference obtained by subtracting the current number of entries from the permissible largest number of entries (object_entries_maximum_number) is greater than "0" or not. The controller 11 proceeds to Step S16 if it is determined in Step S15 that the difference is greater than "0" (and hence more entries can be recorded), whereas the controller 11 proceeds to Step S17 if it is determined in Step S15 that the difference is not greater than "0" (and hence no more entries can be recorded).

In Step S16, the controller 11 determines if the difference obtained by subtracting the byte length of the entries to be written for the recording reservation from the permissible largest byte length (object_entry_maximum_size) extracted in Step S13 is greater than "0" or not and, in other words, if the permissble largest byte length is not exceeded or not. The controller 11 proceeds to Step S18 of FIG. 20 if it is determined in Step S16 that the difference is greater than "0" (and hence the permissible largest byte length is not exceeded), whereas the controller 11 proceeds to Step S17 if it is determined in Step S16 that the difference is not greater than "0" (and hence the permissible largest byte length is exceeded).

If any of the requirements of Step S14 through S16 is not met and the controller 11 is forced to proceeds to Step S17, the controller 11 displays a warning such as "no more reservation" on a display means (not shown). The warning indicates that the RSB in the BBS 14 of the IRD 1 has no room for writing reservation information. Then, the user understands that no recording reservation is allowed because the RSB is full. If text information describing details of reservations as shown in FIG. 18 is written in the Resource Schedule Entry of the RSB in the BBS 14 of the IRD 1 as shown in FIG. 8, the controller displays the test information. As a result, the user can know the details of the reservations. As details of the current reservations are displayed in the form of text, the user can judge if the reservations include those that are not necessary to him or her or not. In other words, the user can judge which reservations should be maintained and which reservations maybe cancelled. Then, the user can maintain the reservations that should not be cancelled and cancel those that should not necessarily be maintained in order to make additional reservations for recording programs. Additionally, if the information on each reservation is made to contain a notice that the reservation is a preliminary one or not at the time of entry, it will be of a great help to any user who wants to make a reservation subsequently because he or she may be able to cancel the preliminary reservation and make a new reservation.

If, on the other hand, all the requirements of Step S14 through S16 are met and hence the RSB in the BBS 14 of the IRD 1 still has room for writing reservation information, the controller 11 proceeds to Step S18 and on in FIG. 20 and determines if a recording reservation is already made for the scheduled time of recording.

More specifically, in Step S18, the controller 11 selects "0" for variable i for the purpose of initialization as shown in FIG. 20 and proceeds to Step S19, where it determines if the difference obtained by subtracting the variable i from number of entries (number_of_entries) recorded in the RSB of the BBS 14 of the IRD 1 is greater than "0" or not and hence if all the entries recorded in the RSB of the BBS 14 are checked or not. If it is determined in Step S19 that the difference obtained by subtracting the variable i from number of entries (number_of_entries) recorded in the RSB of the BBS 14 of the IRD 1 is greater than "0" and hence there is at least an entry that is not checked yet, the controller 11 proceeds to Step S20, where it reads out object_entry [i] stored in the RSB of the BBS 14 (which is object_entry [0] in this case) as shown in FIG. 7. Note that, while the read operation in Step S20 is conducted by using the READ command shown in FIG. 23, the object position is used for describing the descriptor identifier. The time related information of the reservation (start_time, duration in FIG. 8) and the identification information of the subunits to be used (subunit_type_and_ID [0]) are stored along with the text information as shown in FIGS. 15 through 18 in the object entry [i].

Then, the controller 11 proceeds to Step S21, where it determines if the time related information (start_time, Duration) input by the user in Step S10 is, if partly, a duplicate of the time related information (start_time, Duration) read out in Step S20 or not. The controller 11 proceeds to Step S22 if it is determined in Step S21 that the time related information input by the user is, if partly, a duplicate of the latter time related information, whereas the controller 11 proceeds to Step S22 if it is determined that there is no duplicate.

If the controller 11 proceeds to Step S22 as a result of its determination in Step S21 that there is no duplicate and the subunit to be used for the recording reservation is selected in Step S10 (the tuner subunit 12 in this case), the controller 11 then determines if it agrees with the subunit read out in Step S20 (subunit_type_and_ID) or not. Then, the controller 11 proceeds to Step S24 if it is determined in Step S22 that the two subunits agree with each other, whereas the controller 11 proceeds to Step S23 if it is determined in Step S22 that the two subunits does not agree with each other.

If it is determined in Step S22 that the two subunits agree with each other, it means that the subunits agree with each other also in terms of scheduled time of use so that the controller 11 displays a warning that "the reservation is a mere duplicate" in Step S24. As a result, the user can know that the reservation is a mere duplicate of some other reservation and hence prevent the problem of double booking. If the information on the reservation is described as text information in the Resource Schedule Entry of the RSB of the BBS 14 of the IRD 1 as shown in FIG. 8, the controller 11 displays the text information. As a result, the user can know the details of the duplicate reservation as well as the other reservations. As details of the current reservations are displayed in the form of text, the user can judge if the reservations include those that are not necessary to him or her or not. In other words, the user can judge which reservations should be maintained and which reservations may be cancelled. Then, the user can maintain the reservations that should not be cancelled and cancel those that should not necessarily be maintained so that he or she may be able to make some other reservation. Additionally, if the information on each reservation is made to contain a notice that the reservation is a preliminary one or not at the time of entry, it will be of a great help to any user who wants to make a reservation subsequently because he or she may be able to cancel the preliminary reservation and make a new reservation.

If, on the other hand, it is determined in Step S21 that the reservation is not a duplicate in terms of time or it is a duplicate in terms of time but not in terms of subunit, there is no risk of double booking. Therefore, the controller 11 increments the variable i by 1 in Step S23 and then returns to Step S19 to repeat the above steps until it is determined that the difference obtained by subtracting the variable i from number_of_entries is not greater than "0". In other words, the controller 11 retrieves and checks all the object entries [i] stored in the RSB of the BBS 14 of the IRD 1 for duplication in terms of time.

If it is determined in Step S19 that the difference obtained by subtracting the variable i from number_of_entries is not greater than "0" (and hence all the object entries [i] are retrieved and checked), the controller 11 proceeds to Step S25 shown in FIG. 21. It may alternatively be so arranged that the processing operations from Step S14 to Step S17 as described above are carried out only when the answer to the question in Step S19 is NO.

In Step S25 of FIG. 21, the controller 11 creates an object entry for the RSB of the BBS 14 of the IRD 1. Note that the processing operation of creating an object entry for the RSB of the BBS 34 of the DVCR 3 is carried out subsequent to the processing operations for the RSB of the IRD 1 as shown in FIGS. 19 through 21.

FIG. 24 shows the format of the CREATE command that is output from the controller 11 when it creates an object entry for the RSB. Note that, when creating an object entry for the RSB of the BBS 14 of the IRD, the controller 11 controls the BBS 14 as if a CREATE command is fed by way of the bus 2 although both the BBS 14 and the controller 11 are arranged inside the IRD 1 and no bus 2 is required to connect them. When carrying out the processing operation of creating an object entry for the RSB 61 of the BBS 34 of the DVCR 3 subsequent to the processing operations for the RSB of the IRD 1 as shown in FIGS. 19 through 21, the controller 11 outputs a CREATE command having the format as shown in FIG. 24 and transmits it to the BBS 34 of the DVCR 3 (the controller 31 controlling the BBS 34 to be more accurate) by way of the bus 2.

FIG. 25 shows the value that can be specified by subfunction_1 of FIG. 24 and "01" (create a new object and its child list) is used in this embodiment. FIG. 26 shows the format of subfunction_1_specification for subfunction_1=01 in FIG. 24. FIG. 27 shows the values of the fields in FIG. 26. More specifically, when values of "$20_{16}$", "$22_{16}$" and "$11_{16}$" shown in FIG. 27 are selected respectively for the fields of descriptor_identifier_where, descriptor_identifier_what_1,_2 as shown in FIG. 26, they signify "create a new object and its child list".

Create commands of AV/C commands are described in detail in IEEE 1394 (refer to internet home page http://www.1934TA.org). The drawing illustrating this embodiment is cited from "Enhancement to the AV/C General Specification 3.0 Version 1.0 FC2 and TA Document 1999005 AV/C Bulletin Board Subunit General Specification 1.0 Draft 0.99:149). Some of the Information List Descriptors of the board are writable and readable and list type is used to discriminate them.

A conceivable general technique of externally writing new information in AV/C Descriptor may be that the controller (Posting Device) issues a CREATE command to the target to produce a prototype of the information to be written at the target and subsequently controls the specific information to be written. For instance, when information is written for the first time, the controller may specify an intended list and issue an AV/C Descriptor CREATE command. Upon receiving the command, the target internally creates an object on the basis of the prototype having the data structure specified by the AV/C general. The prototype of the data structure as specified by the AV/C general includes fields for showing the object IDs. In the case of a list using AV/C Descriptor, the object ID is managed by the target. In other words, when the object is created, the target attaches an ID that unequivocally specifies the object to the object and comes to take the functional role of managing the ID.

An object ID is an ID number for unequivocally specifying the object in a list. Therefore, it is necessary for the entity that is responsible for managing the object ID to take a functional role of preventing the object ID from being duplicated. The BBS itself is a place that provides information and the controller should be responsible for managing object IDs.

However, there can arise a problem of contradiction when a CREATE command is issued to a subunit because the target assigns an object ID that the controller should manage when an object is created. Additionally, the operation write control has to be continued after issuing a CREATE command. Therefore, an imperfect object can be created if the controller is disconnected from the bus while it is carrying out a write operation because the processing operation is divided into a plurality of steps.

Therefore, under such circumstances, it is necessary to make an arrangement for identifying any imperfect object and, if such an object is created, successfully eliminating the object.

In this embodiment of the invention, there is provided an arrangement for defining the means for writing information in the BBS according to a standard and identifying any imperfect object.

With such an arrangement, a number (e.g., all "0s") that is temporarily used for managing the target is assigned to the part of the GUID of the object ID of the target that comprises a global unique ID (GUID) and a record ID. The controller firstly writes information in the object and, after properly completing the write operation, rewrites the GUID.

With such a procedure to be followed, there will be no object whose GUID is all "0s" if the write operation is properly completed there so that any object whose GUID is all "0s" can be identified as an object that has turned imperfect during the write operation.

With this arrangement, any object where a write operation is going on can be unequivocally identified and objects where information is written properly and those where information is written imperfectly can be discriminated. Furthermore, it is also possible to delete any imperfect objects (invalid object) in a simple manner. As a result, the valid memory in an electronic device can be fully exploited. Additionally, since a simple method of assigning all "0s" to the GUID of the object ID is used for identifying an object where a write operation is going, the software for eliminating any imperfect objects can be prepared without difficulty.

Note that, in Step S25 of FIG. 21, it is possible to use an INSERT command in place of a CREATE command.

Then, the controller 11 proceeds to Step S26, where the controller 11 writes details of the reservation in entry_specific_information field (see FIGS. 3 and 8) of the RSB of the BBS 14 of the IRD 1. Thus, start_time, Duration, repeat_information, title of the subunit (subunit_type_and_ID) to be used and other details of the reservation are written there.

FIG. 28 shows the format of the WRITE DESCRIPTOR command output from the controller 11. However, note that, when writing information in the RSB of the BBS 14 of the IRD, the controller 11 controls the BBS 14 as if a WRITE DESCRIPTOR command is fed by way of the bus although both the BBS 14 and the controller 11 are arranged inside the IRD 1 and no bus is required to connect them. When carrying out the processing operation of writing information in the RSB 61 of the BBS 34 of the DVCR 3 subsequent to the processing operations for the RSB of the IRD 1 as shown in FIGS. 19 through 21, the controller 11 outputs a WRITE DESCRIPTOR command having the format as shown in FIG. 28 and transmits it to the BBS 34 of the DVCR 3 (the controller 31 controlling the BBS 34 to be more accurate) by way of the bus 2.

In FIG. 28, a value of "$0A_{16}$" representing a WRITE DESCRIPTOR is described in opcode at the top and a descriptor identifier for identifying the descriptor to be used as the object of a write operation is described in operated 0. This describing operation takes place at the object position. Then, a value of "$50_{16}$" is described to indicate partial_replace as subfunction. As a result, an operation of partial insert or partial delete is carried out. In the case of an operation of partial insert, a new descriptor is inserted immediately before the definition made by the operand that is specified by descriptor_identifier. In the case of an operation of partial delete, the descriptor defined by the descriptor_identifier is deleted. In FIG. 28, group_tag is used for an update operation that can not be divided on the descriptor for which a WRITE DESCRIPTOR command has to be issued. In this example, a value of "$00_{16}$" representing that a data is immediately written to the descriptor is described (immediate). In FIG. 28, replacement_data_length shows the number of bytes of the operand of replacement_data, or the length of the data to be written, while address shows the position where the processing operation is to be conducted. Additionally, "0" for replacement_data_length means partial delete, in which case, no operand of replacement_data exists. Then, original_data_length takes a value greater than "0", which indicates the number of bytes to be deleted. When original_data_length is equal to "0", a processing operation for partial insert is carried out. Then, replacement_data_length takes a value greater than "0", which indicates the number of bytes to be inserted.

Then, the controller 11 proceeds to Step S27, where it determines if any details of the reservation should be added (described) as text information in the Resource Schedule Entry of the RSB of the BBS 14 of the IRD 1 as shown in FIG. 8 or not. Then, the controller 11 proceeds to Step S28 if it is determined that such details should be added, whereas the controller 11 proceeds to Step S31 if no such details need to be added.

Figure 29:
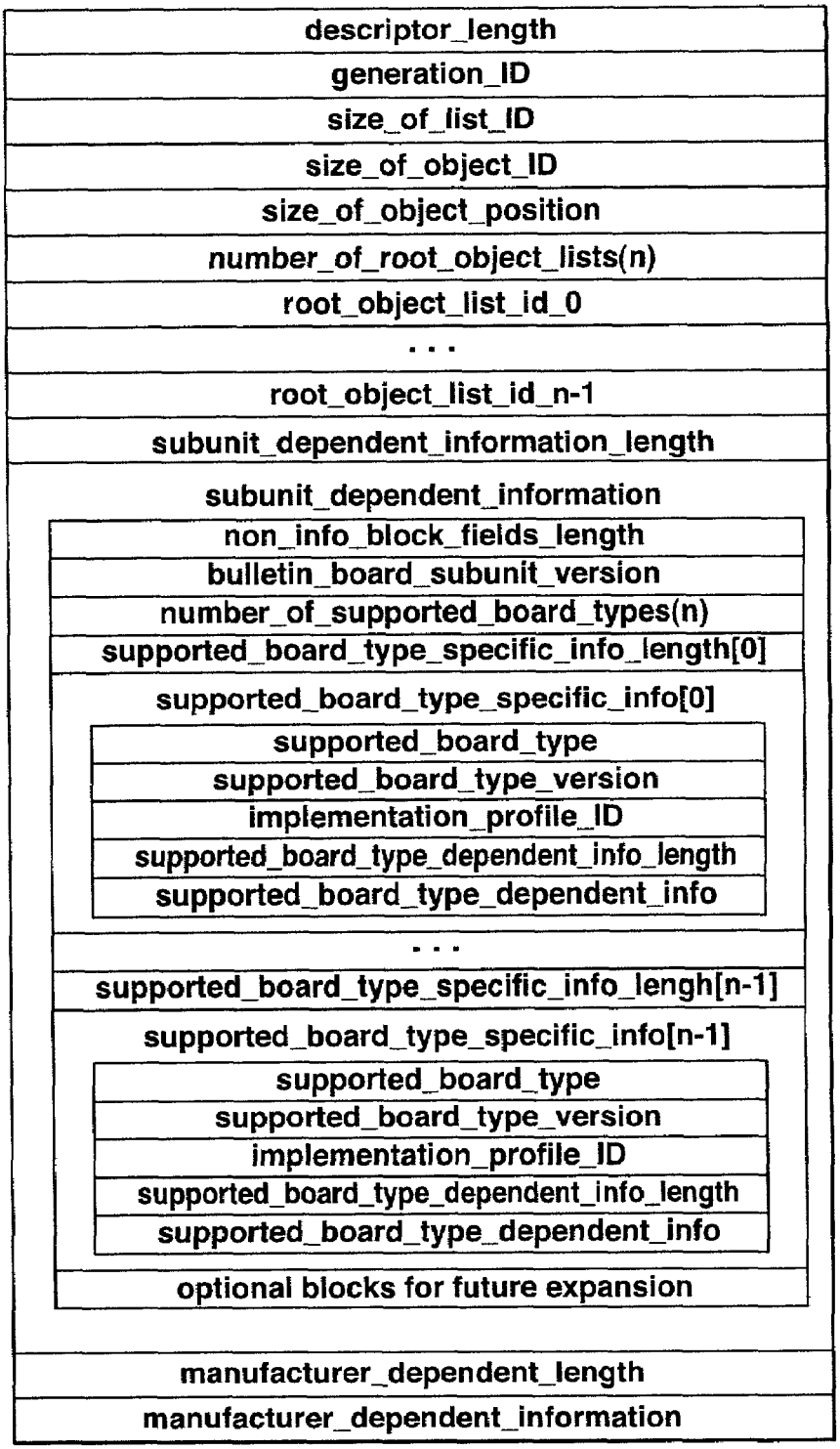
FIG. 29 is a schematic illustration of the format of the BBS.

In Step S28, the controller 11 firstly reads the RSB board type in the Subunit Identifier Descriptor as shown in FIG. 29.

Referring to FIG. 29, descriptor_length shows the length of the Descriptor and generation_ID shows the AV/C descriptor format used in the BBS and is normally made equal to "$00_{16}$", while size_of_list shows the number of the list ID and size_of_object_ID shows the number of the object ID. Additionally, size_of_object_position shows the number of bytes that is used when the object in the list is referred to and number_of_root_object_lists shows the number of root object lists to which the BBS is directly related, while root_object_list_id_x (x=0, 1, 2, ..., n−1) shows the ID of each of the root object lists to which the BBS is directed related. Furthermore, subunit_dependent_information_length shows the length of Subunit_dependent_information, in which information relating to the format and the contents on which the BBS depends. Note that subunit_dependent_information contains field_length, bulletin_board_subunit_version, number_of_supported_board_type (n) and supported_board_type_specific_of_length [0] as well as supported_board_type_specific_info [0] through supported_board_type_specific_info [n−1] and supported_board_type_specific_of_length [0] through supported_board_type_specific_of_length [n−1] that indicates their respective lengths in non_info_block. Additionally, manufacturer_dependent_length and manufacturer_dependent_information are also described. If the values of root_object_list_id represents the RSB, it is made to take a predetermined value of "$1001_{16}$" as shown in FIG. 30. The processing operation of reading information from the RSB is simplified when the ID representing the RSB (which is described as Resource Schedule List in FIG. 30) is held to a predetermined value.

Referring to FIG. 29, supported_board_type_specific_information has a format as shown in FIG. 31. Referring to FIG. 31, a value of "$01_{16}$" representing the RSB of FIG. 6 is described as supported_board_type and supported_board_type_version shows the version number of the bulletin Board Type Specification, while implementation_profile_ID shows the profile ID version for the board type and supported_board_type_dependent_information_length shows the number of bytes of supported_board_type_dependent_information. Information specific to each board type specification is written as supported_board_type_dependent_information.

Thereafter, the controller 11 proceeds to Step S29, where the controller 11 determines if the version number of RSB is greater than that of version 1.0 in which character_code_information_block, language_code_information_block and raw_text_information_block shown information FIGS. 8 and 15 through 18 are defined as information blocks to be used for writing text information in the Resource Schedule entry of the RSB or not. The controller 11 proceeds to Step S30 if it is determined that the version number of the RSB is greater than 1.0, whereas the controller 11 proceeds to Step S31 if it is determined that the version number is not greater than 1.0.

In Step S30, the controller 11 adds text information corresponding to the information input by the user for the purpose of making a recording reservation to the information block in the Resource Schedule Entry of the RSB of the BBS 14 that is to be used for writing text information.

Figures 32, 33:
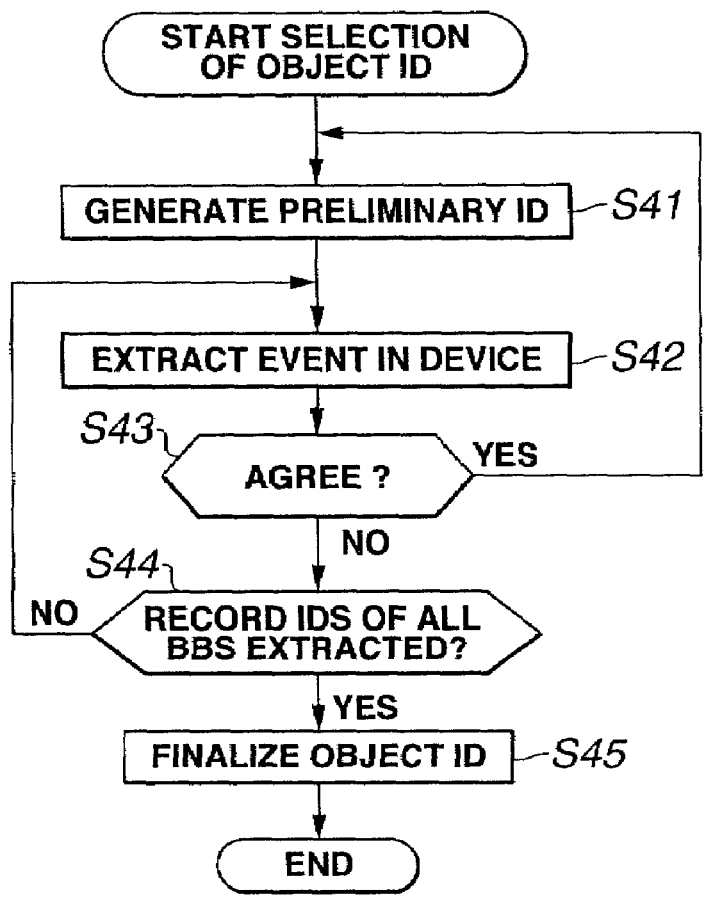
FIG. 32 is a schematic illustration of the format of the close command to be used for the purpose of the invention.
FIG. 33 is a flowchart illustrating a selection of object ID.

Then, in Step S31, the controller 11 closes the list, or the RSB of the BBS 14. FIG. 32 shows the format of the CLOSE command output from the controller 11 when closing the RSB. However, not that, when closing the RSB of the BBS 14 of the IRD, the controller 11 controls the BBS 14 as if a CLOSE command is fed by way of the bus although both the BBS 14 and the controller 11 are arranged inside the IRD 1 and no bus is required to connect them. When carrying out the processing operation of closing the RSB of the BBS 34 of the DVCR 3 subsequent to the processing operations for the RSB of the IRD 1 as shown in FIGS. 19 through 21, the controller 11 outputs a CLOSE command having the format as shown in FIG. 32 and transmits it to the BBS 34 of the DVCR 3 (the controller 31 controlling the BBS 34 to be more accurate) by way of the bus 2.

The format of the CLOSE command shown in FIG. 32 is basically same as that of the WRITE OPEN command illustrated in FIG. 22. While the subfunction is made to show a value of "$03_{16}$" representing a WRITE OPEN command in FIG. 22, it is made to show a value of "$00_{16}$" representing a CLOSE command in FIG. 32. Otherwise, the format of FIG. 32 is same as that of FIG. 22.

Thereafter, the controller 11 proceeds to Step S32, where it determines if there exists any other resources relating to reservations. In this case, while the processing operation for reserving the tuner subunit 12 of the IRD 1 is already finished, the processing operation for reserving the VCR subunit 33 of the DVCR 3 is not finished yet. Therefore, the controller 11 determines in Step S32 that there is still another resource relating a reservation and returns to Step S11 shown in FIG. 19.

Thereafter, the controller 11 carries out a sequence of processing operations for reserving the VCR subunit 33 of the DVCR 3. More specifically, the controller 11 carries out the processing operations starting from Step S11 for the RSB 61 of the BBS 34 of the DVCR 3.

When carrying out the processing operations for making a reservation for the VCR subunit 33 of the DVCR 3 in Step S11, the controller 11 transmits a WRITE OPEN command as shown in FIG. 22 to the BBS 34 of the DVCR 3 (the controller 31 of the BBS 34 to be more accurate) by way of the bus 2 in order to make the RSB 61 of the BBS 34 of the DVCR 3 having the VCR subunit 33 become WRITE OPEN.

Then, in Step S12, the controller 11 transmits a READ command as shown in FIG. 23 to the BBS 34 of the DVCR 3 (the controller 31 of the BBS 34 to be more accurate) by way of the bus in order to read the information in the descriptor_lenth and list_specific_information field of the RSB 61.

Then, in Step S13, the controller 11 extracts the permissible largest size of the list (object_list_maximum_size of FIG. 5), the permissible largest number of entries of the list (object_entries_maximum_number of FIG. 5) and the permissible largest byte length (object_entry_maximum_size of FIG. 5) for the RSB 61 in the BBS 34 of the DVCR 3.

If any of the requirements of Step S14 through S16 is not met and the controller 11 is forced to proceeds to Step S17, the controller 11 displays a warning such as "no more reservation" on a display means (not shown). The warning indicates that the RSB 61 in the BBS 34 of the DVCR 3 has no room for writing reservation information. Then, the user understands that no recording reservation is allowed because the RSB is full. If text information describing details of reservations as shown in FIG. 18 is written in the Resource Schedule Entry of the RSB 61 in the BBS 34 of the DVCR 3 as shown in FIG. 8, the controller displays the test information. As a result, the user can know the details of the reservations. As details of the current reservations are displayed in the form of text shown in FIG. 18, the user can judge if the reservations include those that are not necessary to him or her or not. In other words, the user can judge which reservations should be maintained and which reservations may be cancelled. Then, the user can maintain the reservations that should not be cancelled and cancel those that should not necessarily be maintained in order to make additional reservations for recording programs. Additionally, if the information on each reservation is made to contain a notice that the reservation is a preliminary one or not at the time of entry, it will be of a great help to any user who wants to make a reservation subsequently because he or she may be able to cancel the preliminary reservation and make a new reservation.

If, on the other hand, all the requirements of Step S14 through S16 are met and hence the RSB 61 in the BBS 34 of the DVCR 3 still has room for writing reservation information, the controller 11 proceeds to Step S18 and on in FIG. 20 and determines if a recording reservation is already made for the scheduled time of recording. More specifically, in Step S18, the controller 11 selects "0" for variable i for the purpose of initialization as shown in FIG. 20 and proceeds to Step S19, where it determines if the difference obtained by subtracting the variable i from number of entries (number_of_entries) recorded in the RSB 61 of the BBS 34 of the DVCR 3 is greater than "0" or not and hence if all the entries recorde in the RSB 61 of the BBS 34 are checked or not. If it is determined in Step S19 that the difference obtained by subtracting the variable i from number of entries (number_of_entries) recorded in the RSB 61 of BBS 34 is greater than "0" and hence there is at least an entry that is not checked yet, the controller 11 proceeds to Step S20, where it reads out object_entry [i] stored in the RSB 61 of the BBS 34 as shown in FIG. 7.

Then, the controller 11 proceeds to Step S21, where it determines if the time related information (start_time, duration) input by the user in Step S10 is, if partly, a duplicate of the time related information (start_time, duration) read out in Step S20 or not.

If the controller 11 proceeds to Step S22 as a result of its determination in Step S21 that there is no duplicate and the subunit to be used for the recording reservation is selected in Step S10 (the VCR subunit 33 in this case), the controller 11 then determines if it agrees with the subunit read out in Step S20 (subunit_type_and_ID) or not.

If it is determined in Step S22 that the two subunits agree with each other, it means that the subunits agree with each other also in terms of scheduled time of use so that the controller 11 displays a warning that "the reservation is a mere duplicate" in Step S24. As a result, the user can know that the reservation is a mere duplicate of some other reservation and hence prevent the problem of double booking. If the information on the reservation is described as text information in the Resource Schedule Entry of the RSB 61 of the BBS 34 of the DVCR 3 as shown in FIG. 8, the controller 11 displays the text information. As a result, the user can know the details of the duplicate reservation as well as the other reservations. As details of the current reservations are displayed in the form of text, the user can judge if the reservations include those that are not necessary to him or her or not. In other words, the user can judge which reservations should be maintained and which reservations may be cancelled. Then, the user can maintain the reservations that should not be cancelled and cancel those that should not necessarily be maintained so that he or she may be able to make some other reservation. Additionally, if the information on each reservation is made to contain a notice that the reservation is a preliminary one or not at the time of entry, it will be of a great help to any user who wants to make a reservation subsequently because he or she may be able to cancel the preliminary reservation and make a new reservation.

If, on the other hand, it is determined in Step S21 that the reservation is not a duplicate in terms of time or it is a duplicate in terms of time but not in terms of subunit, there is no risk of double booking. Therefore, the controller 11 increments the variable i by 1 in Step S23 and then returns to Step S19 to repeat the above steps until it is determined that the difference obtained by subtracting the variable i from number_of_entries is not greater than "0". In other words, the controller 11 retrieves and checks all the object entries [i] stored in the RSB 61 of the BBS 34 of the DVCR 3 for duplication in terms of time.

If it is determined in Step S19 that the difference obtained by subtracting the variable i from number_of_entries is not greater than "0" (and hence all the object entries [i] are retrieved and checked), the controller 11 proceeds to Step S25 shown in FIG. 21, where it transmits the CREATE command shown in FIG. 24 to the BBS 34 of the DVCR 3 (the controller 31 of the BBS 34 to be more accurate) by way of the bus 2.

Then, the controller 11 proceeds to Step S26, where the controller 11 transmits a WRITE DESCRIPTOR command as shown in FIG. 28 to the BBS 34 of the DVCR 3 (the controller 31 of the BBS 34 to be more accurate) by way of the bus 2 and writes details of the reservation in entry_specific_information fields (see FIGS. 3 and 8) of the RSB 61 of the BBS 34 of the DVCR 3. Thus, start_time, Duration, repeat_information, title of the subunit (subunit_type_and_ID) to be used and other details of the reservation are written there.

Then, the controller 11 proceeds to Step S27, where it determines if any details of the reservation should be added (described) as text information in the Resource Schedule Entry of the RSB 61 of the BBS 34 of the DVCR 3 as shown in FIG. 7 or not. If it is determined that such details should be added, then, the controller 11 proceeds to Step S28, where it firstly reads the RSB board type in the Subunit Identifier Descriptor as shown in FIG. 29. Then, the controller 11 proceeds to Step S29, where it determines if the version number of the RSB 61 of the BBS 34 is greater than that of version 1.0 in which character_code_information_block, language_code_information_block and raw_text_information_block shown information FIGS. 8 and 15 through 18 are defined as information blocks to be used for writing text information in the Resource Schedule entry of the RSB or not.

If it is determined in Step S29 that the version number of the RSB 61 of the BBS 34 is greater than version 1.0, the controller 11 proceeds to Step S30, where it adds text information corresponding to the information input by the user for the purpose of making a recording reservation to the information block in the Resource Schedule Entry of the RSB 61 of the BBS 34.

Then, in Step S31, the controller 11 transmits a CLOSE command as shown in FIG. 32 to the BBS 34 of the DVCR 3 (the controller 31 of the BBS 34 to be more accurate) and closes the RSB 61 of the BBS 34.

Thereafter, the controller 11 proceeds to Step S32, where it determines if there is still another resource relating a reservation. Since all the processing operations for making a reservation for the tuner subunit 12 of the IRD 1 and the VCR subunit 33 of the DVCR 33 are finished by this time and there is not any other resources left to be reserved, the controller 11 ends the operation.

Now, the processing operation for selecting an object ID will be described by referring to FIG. 33. This operation starts when the user makes a recording reservation for using the DVCR 3 by inputting necessary information and the reservation is detected by the controller 11, which operates correspondingly to acknowledge the recording reservation. In this example, an object ID is generated and assigned to the event (recording reservation) from a give time for a predetermined period of time in order to identify and make the even proceed successfully. An object ID is formed by 72 bits, of which the MSB 64 bits are used as ID, or the GUID (Global Unique ID) to be more accurate, for the device having all the information relating to the reservation and the remaining LSB 8 bits are used as a value to be selected in the device, which is referred to as record ID. The use of an object ID including a GUID ID and a record ID makes the operation of selecting an ID for an event a relatively simple one.

The object ID needs to be identifiable to all the devices connected to the bus 2. In this embodiment, there may be cases where the contents of a unit (device) are read by some other unit (device) so that the related subunits of a plurality of units can commonly carry out processing operations (in a concerted manner). Therefore, any of the units of the system should be able to known if there are processing operations that have to be commonly carried out or not.

As long as object IDs are identifiable to all the devices connected to the bus 2, numbers starting from one may be sequentially assigned to events as object IDs, for instance. However, with such an arrangement, when a given unit tries to assign an object ID to a given event, all the remaining units connected to the bus 2 have to read all the object IDs that are already assigned to other events and determine if there is a duplicate or not so that a number that has no duplicate may be selected. However, in this embodiment, a GUID is contained in an object ID and the value of the GUID of a unit is specific to the unit so that no other unit connected to the bus has a GUID with the same value. Therefore, as long as each unit selects a record ID that does not have any duplicate in itself for an object ID, the object ID that includes a GUID and the record ID does not have any duplicate in all the remaining units connected to the bus 2. Thus, a processing operation as shown in the flow chart of FIG. 33 is carried out to select an object ID for an event to be registered in the RSB.

Firstly, in Step S41, the controller 11 generates a preliminary ID as record ID of an object ID (=global unique ID+record ID) that may be used in the IRD 1 to unequivocally identify the reservation information.

Then, in Step S42, the controller 11 extracts an event out of the events registered in the RSB in the BBS 14 of the IRD 1 and then the record ID of the object ID assigned to the event. In Step S43, the controller 11 determines if the preliminary ID generated by itself in Step S41 agrees with the record ID extracted in Step S42 or not. If the two agree with each other, the controller 11 returns to Step S41 and change the preliminary ID. Then, it repeats Steps S41 through S43 until a preliminary ID that does not agree with the record ID is generated.

If it is determined in Step S42 that the preliminary ID and the record ID extracted in Step S42 do not agree with each other, the controller proceeds to Step S44, where it determines if all the events published in the RSB and relating to its related subunits have been extracted or not. If there are some events that are not extracted yet, the controller 11 returns to Step S42 and repeats Steps S42 through S44 until it is determined that all the events are extracted. If, on the other hand, it is determined that all the events are extracted, the controller 11 proceeds to Step S45, where it generates an object ID by adding the preliminary ID (record ID) generated in Step S41 to the device ID (GUID) of the IRD 1 and describes in the RSB.

In this way, an object ID can be selected simply by checking the RSB for the related subunits (without checking the RSBs not relating to its related subunits). It will be appreciated that this is because each object ID of the RSB of a unit contains a GUID specific to the unit so that the object ID selected by the unit would never agree with any object IDs of the other units connected to the bus 2. Therefore, the operation of selecting an object ID is very simple according to the invention.

The above described series of processing operations of this embodiment may be carried out either by the hardware or by the software. When the series of processing operations are carried out by the software, the programs of the software may be installed in the controller that is a dedicated device or in some other device such as a general purpose personal computer.

Figure 34:
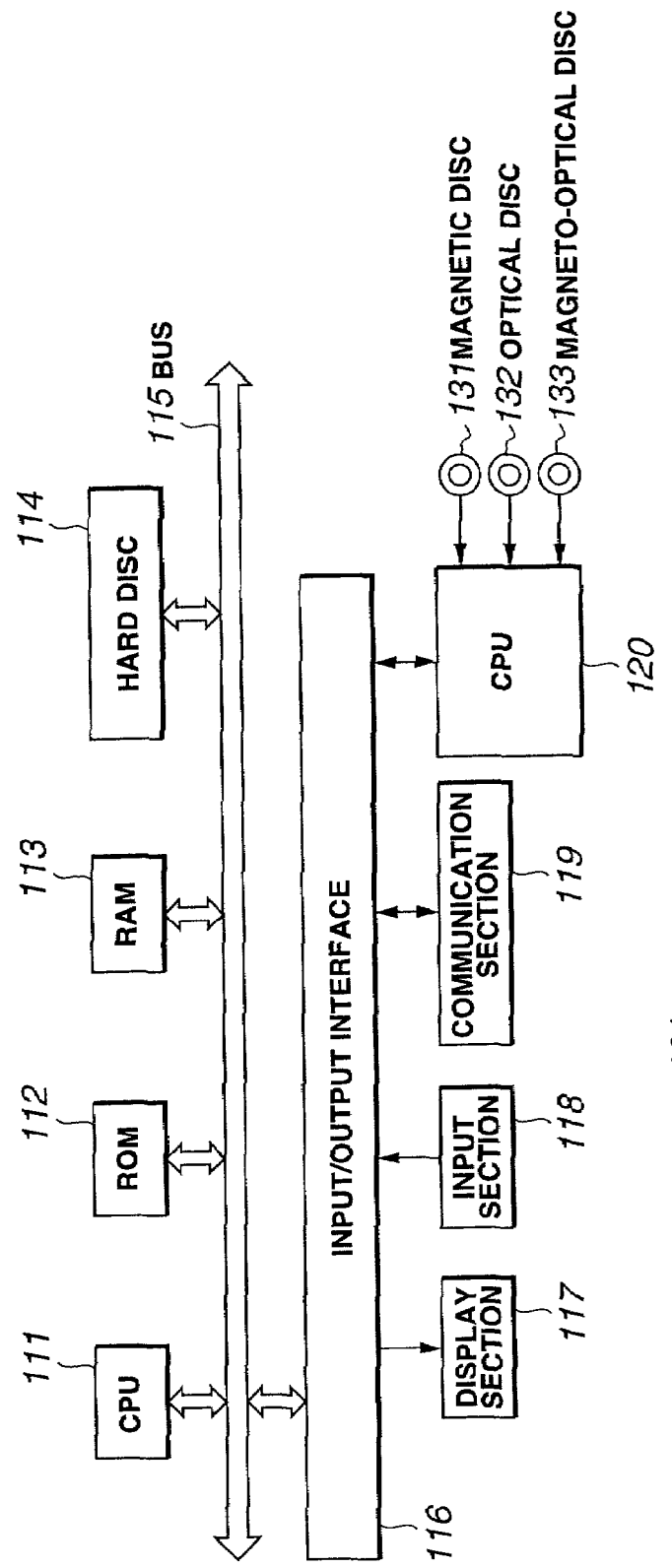
FIG. 34 is a schematic block diagram of a computer, illustrating its configuration.

Referring to FIG. 34, a general purpose personal computer 101 comprises a CPU (central processing unit) 111. An input/output interface 116 is connected to the CPU 111 by way of a bus 115 so that, upon receiving a command input by the user from the input section 118 that may be a keyboard and/or a mouse by way of the input/output interface 116, the CPU 111 in response reads out the program for executing the above described series of processing operations from the recording medium that stores it and may be a ROM (read only memory) 112, a hard disc 114 or one of the memory devices fitted to drive 120 including a magnetic disc 131, an optical disc 132 and a magneto-optical disc 133 and writes it in RAM (random access memory) 113 to carry out the program. Note that the programs stored in the hard disc may include those that are stored in it before delivered to the user and those received by the communication section 119 and downloaded to the hard disc by way of a satellite and/or a network.

The CPU 111 outputs the image signal obtained as a result of the processing operations of the program to a display section 117 that may comprise an LCD (liquid crystal display) or a CRT (cathode ray tube).

Note that the present invention is by no means limited to the above described embodiment, which may be modified or altered appropriately in various ways without departing from the scope of the invention. For example, the controller 11 of the IRD 1 controls the operation of writing text information to and reading text information from the RSB 61 of the BBS 34 of the DVCR 3 in this embodiment, it may alternatively be so arranged that the controller of some other device (unit) controls the operation of writing text information to and reading text information from the RSB 61 of the BBS 34 of the DVCR 3. With such an arrangement, if the DVCR display an image for the purpose of confirmation, the user can see the reservations of other devices on the display screen of the DVCR regardless if the reservations include those of external devices other than the DVCR itself because the contents of reservation are expressed in an information block format of RSB.

What is claimed is:

1. An information processing device adapted to be connected to other information processing devices by way of a network, comprising:
    a function execution means for executing a predetermined function, the function execution means having a schedule of operation;
    a storage means for storing a first piece of information on the schedule of operation of the function execution means;
    an acquisition means for acquiring a second piece of information on the schedule of operation of the function execution means not contained in the previously stored first piece of information, wherein the second piece of information includes information associated with a recording reservation of the devices in the network;
    a control means for putting the second piece of information into a predetermined block format and storing it in the storage means as additional information to the first piece of information; and
    a display means for displaying a warning indicating double booking of recording reservations to a user and displaying a cause of the double booking, regardless of whether the cause of double booking is located on the information processing device or on any other remaining processing device in the same network;
    the control means being for cancelling the recording reservation when a double booking occurs and the recording reservation is a preliminary reservation, wherein an entry of the recording reservation as the preliminary reservation provides notice at time of the entry that the recording reservation may be cancelled to record a subsequent reservation.

2. The information processing device according to claim 1, wherein
    said first piece of information includes information on said schedule of operation as defined in a digital interface format; and
    said second piece of information further includes text information adapted to display details of said schedule of operation.

3. The information processing device according to claim 2, wherein said second piece of information further includes a character code and a language code representing a raw text and the coding of the raw text.

4. The information processing device according to claim 1, wherein said control means is adapted to controlling the storage means of another information processing device connected to said network for reading and writing said first piece of information and said second piece of information.

5. The information processing device according to claim 1, wherein said control means is adapted to controlling said storage means for reading and writing said first piece of information and said second piece of information according to a command from the control means of another information processing device connected to said network.

6. The information processing device according to claim 1, wherein said acquisition means is adapted to generating said second piece of information from the defined information on the schedule of operation of said function execution means input by the user of the device.

7. The information processing device according to claim 1, wherein said acquisition means is adapted to acquiring said second piece of information from the storage means of another information processing device connected to said network storing said second piece of information.

8. An information processing method to be used for an information processing device adapted to be connected to other information processing devices by way of a network and having a function execution means for executing a predetermined function and a storage means for storing a first piece of information on a schedule of operation of the function execution means, the method comprising:
    acquiring a second piece of information on the schedule of operation of the function execution means not contained in the previously stored first piece of information, wherein the second piece of information includes information associated with a recording reservation of the devices in the network;
    putting the second piece of information into a predetermined block format and storing it in the storage means as additional information to the first piece of information;
    displaying a warning indicating double booking of recording reservations to a user and displaying a cause of the double booking, regardless of whether the cause of double booking is located on the information processing device or on any other remaining processing device in the same network; and
    cancelling the recording reservation when the recording reservation is a preliminary reservation, wherein an entry of the recording reservation as the preliminary reservation provides notice at time of the entry that the recording reservation may be cancelled to record a subsequent reservation.

9. The information processing method according to claim 8, wherein
    said first piece of information includes information on said schedule of operation as defined in a digital interface format; and said second piece of information further includes text information adapted to display details of said schedule of operation.

10. The information processing method according to claim 9, wherein said second piece of information further includes a character code and a language code representing a raw text and the coding of the raw text.

11. The information processing method according to claim 8, wherein said method is adapted to controlling the storage means of another information processing device connected to said network for reading and writing said first piece of information and said second piece of information.

12. The information processing method according to claim 8, wherein said method is adapted to controlling said storage means for reading and writing said first piece of information and said second piece of information according to a command from the control means of another information processing device connected to said network.

13. The information processing method according to claim 8, wherein said method is adapted to generating said second piece of information from the defined information on the schedule of operation of said function execution means input by the user of the device.

14. The information processing method according to claim 8, wherein said method is adapted to acquiring said second piece of information from the storage means of another information processing device connected to said network storing said second piece of information.

15. A computer readable medium having a program to cause an information processing device execute a method comprising:
 acquiring a second piece of information on a schedule of operation of a function execution means, the second piece of information not contained in a stored first piece of information, wherein the second piece of information includes information associated with a recording reservation of the devices in the network;
 putting the second piece of information into a predetermined block format and storing it in a storage means as additional information to the first piece of information;
 displaying a warning indicating double booking of recording reservations to a user and displaying a cause of the double booking, regardless of whether the cause of double booking is located on the information processing device or on any other remaining processing device in the same network; and
 cancelling the recording reservation when the recording reservation is a preliminary reservation, wherein an entry of the recording reservation as the preliminary reservation provides notice at time of the entry that the recording reservation may be cancelled to record a subsequent reservation.

* * * * *